(12) United States Patent
Suzuki

(10) Patent No.: US 10,539,998 B2
(45) Date of Patent: Jan. 21, 2020

(54) INFORMATION PROCESSING SYSTEM, CONTROL METHOD, AND MANAGEMENT SERVER

(71) Applicant: FUJITSU LIMITED, Kawasaki-shi, Kanagawa (JP)

(72) Inventor: Shigeto Suzuki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 255 days.

(21) Appl. No.: 15/372,511

(22) Filed: Dec. 8, 2016

(65) Prior Publication Data
US 2017/0185138 A1    Jun. 29, 2017

(30) Foreign Application Priority Data

Dec. 24, 2015   (JP) .................................. 2015-251902

(51) Int. Cl.
G06F 1/26 (2006.01)
G06F 1/3287 (2019.01)
G06F 1/3209 (2019.01)

(52) U.S. Cl.
CPC ............ *G06F 1/3287* (2013.01); *G06F 1/266* (2013.01); *G06F 1/3209* (2013.01); *Y02D 10/171* (2018.01)

(58) Field of Classification Search
CPC ...... G06F 1/266; G06F 1/3209; G06F 1/3287; Y02D 10/171
See application file for complete search history.

(56) References Cited

U.S. PATENT DOCUMENTS

| | | | |
|---|---|---|---|
| 6,628,009 B1 * | 9/2003 | Chapel ..................... | H02J 3/26 307/14 |
| 9,680,390 B1 * | 6/2017 | Rose ......................... | H02J 1/00 |
| 2009/0132842 A1 * | 5/2009 | Brey ...................... | G06F 1/3203 713/322 |
| 2012/0092811 A1 * | 4/2012 | Chapel .................... | H04L 12/10 361/622 |
| 2012/0098340 A1 * | 4/2012 | Yokoyama ................ | H02J 3/14 307/31 |
| 2013/0226362 A1 * | 8/2013 | Jagadishprasad ..... | G06F 9/5094 700/297 |

FOREIGN PATENT DOCUMENTS

JP   2009-169874   7/2009

* cited by examiner

*Primary Examiner* — Fahmida Rahman
(74) *Attorney, Agent, or Firm* — Fujitsu Patent Center

(57) ABSTRACT

An information processing system includes a plurality of servers stored in a first rack; and a management server coupled to the plurality of servers and configured to: acquire consumed power values from the plurality of servers when power is supplied to the plurality of servers via first power supply lines coupled to a first power strip of the first rack, calculate the total of the consumed power values based on the values of power consumed by the plurality of servers, and switch a power supply of at least one servers among the plurality of servers so that power is supplied to the at least one server via a second power supply line coupled to a second power strip of a second rack when the total of the consumed power values exceeds a first threshold.

9 Claims, 15 Drawing Sheets

FIG. 9

<SVTBL>

| SERVER NAME | STORAGE RACK NAME | INTRA-RACK POSITION | DEVICE NAME | SERIAL NUMBER | ACQUISITION TIME AND DATE | POWER SUPPLY CONNECTION RACKS | CONNECTION STATES | CONSUMED POWER VALUE [W] |
|---|---|---|---|---|---|---|---|---|
| SV1242 | RC12 | U42 | SV200 | AEFE0183 | OCTOBER 30, 2015; 11:25 | RC12<br>RC13 | EN<br>DIS | 244 |
| SV1241 | RC12 | U41 | SV200 | DIAI7938 | OCTOBER 30, 2015; 11:26 | RC12<br>RC11 | EN<br>DIS | 248 |
| SV1240 | RC12 | U40 | SV200 | VOID7392 | OCTOBER 30, 2015; 11:27 | RC12<br>RC13 | EN<br>DIS | 252 |
| SV1239 | RC12 | U39 | SV200 | NVPS6392 | OCTOBER 30, 2015; 11:28 | RC12<br>RC11 | EN<br>DIS | 243 |
| SV1238 | RC12 | U38 | SV200 | TXZP0971 | OCTOBER 30, 2015; 11:29 | RC12<br>RC13 | EN<br>DIS | 250 |
| ... | ... | ... | ... | ... | ... | ... | ... | ... |

<RCTBL>

| RACK NAME | VALUE (W) OF POWER CONSUMED BY PDU |
|---|---|
| RC11 | 5830 |
| RC12 | 6020 |
| RC13 | 4830 |
| RC14 | 5250 |
| ... | ... |

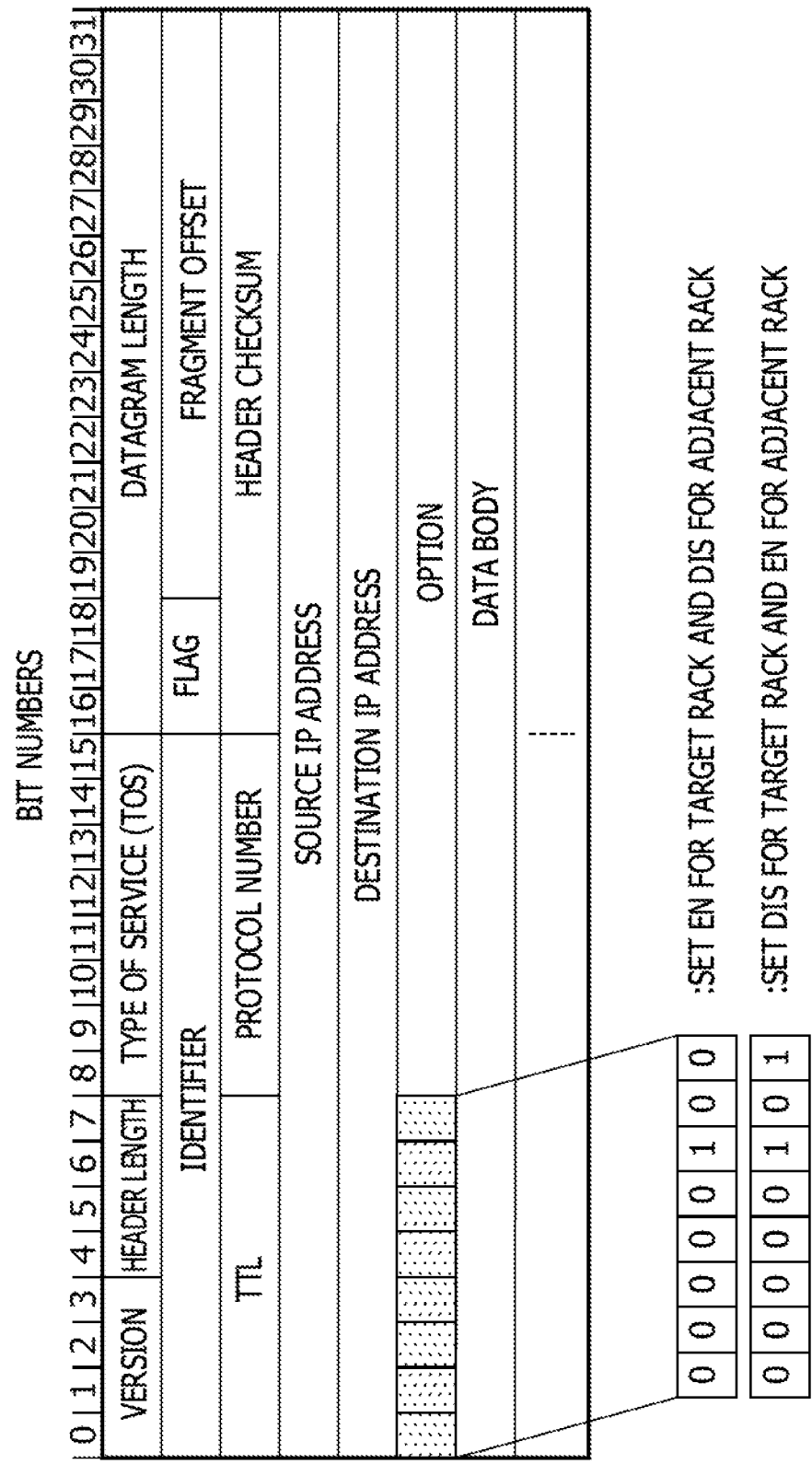

INFORMATION PROCESSING SYSTEM, CONTROL METHOD, AND MANAGEMENT SERVER

CROSS-REFERENCE TO RELATED APPLICATION

This application is based upon and claims the benefit of priority of the prior Japanese Patent Application No. 2015-251902, filed on Dec. 24, 2015, the entire contents of which are incorporated herein by reference.

FIELD

The embodiments discussed herein are related to an information processing system, a control method, and a management server.

BACKGROUND

A method for connecting, via power lines, multiple blade server systems, each of which has multiple blade servers and multiple power supply devices, and sharing power supply devices between the blade server systems has been proposed (refer to, for example, Japanese Laid-open Patent Publication No. 2009-169874). According to the method, power is supplied from power supply devices of a high-load blade server system to a low-load blade server system, and output loads of the power supply devices are equal to each other.

For example, the number of information processing devices able to be stored in multiple enclosures, each of which is included in an information processing system and provided to store multiple information processing devices, is determined to ensure that the total of rated power values of the information processing devices to be stored in the enclosures is equal to or smaller than the maximum value of power able to be supplied to the enclosures. However, since the information processing devices may not operate with the rated power values, the total of power consumed by the information processing devices stored in the enclosures is lower than the maximum value of power able to be supplied to the enclosures. As a result, the densities at which the information processing devices are stored in the enclosures are reduced and the performance of the information processing system is reduced, compared with a case where the number of information processing devices to be stored in the enclosures is determined based on power actually consumed by the information processing devices. In light of the aforementioned fact, it is preferable that the densities at which information processing devices are stored in the enclosures be increased and the performance of the information processing system be improved.

SUMMARY

According to an aspect of the invention, an information processing system includes a plurality of servers stored in a first rack; and a managing server coupled to the plurality of servers and configured to: acquire consumed power values from the plurality of servers when power is supplied to the plurality of servers via first power supply lines coupled to a first power strip of the first rack, calculate the total of the consumed power values based on the values of power consumed by the plurality of servers, and switch a power supply of at least one servers among the plurality of servers so that power is supplied to the at least one server via a second power supply line coupled to a second power strip of a second rack when the total of the consumed power values exceeds a first threshold.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 9 is a diagram illustrating an example of a server management table illustrated in FIG. 8 and a rack management table illustrated in FIG. 8;

FIG. 10 is a diagram illustrating an example of the structure of a packet to be transmitted by the managing server illustrated in FIG. 8 to a BMC;

DESCRIPTION OF EMBODIMENTS

Hereinafter, embodiments are described with reference to the accompanying drawings.

Figure 1:
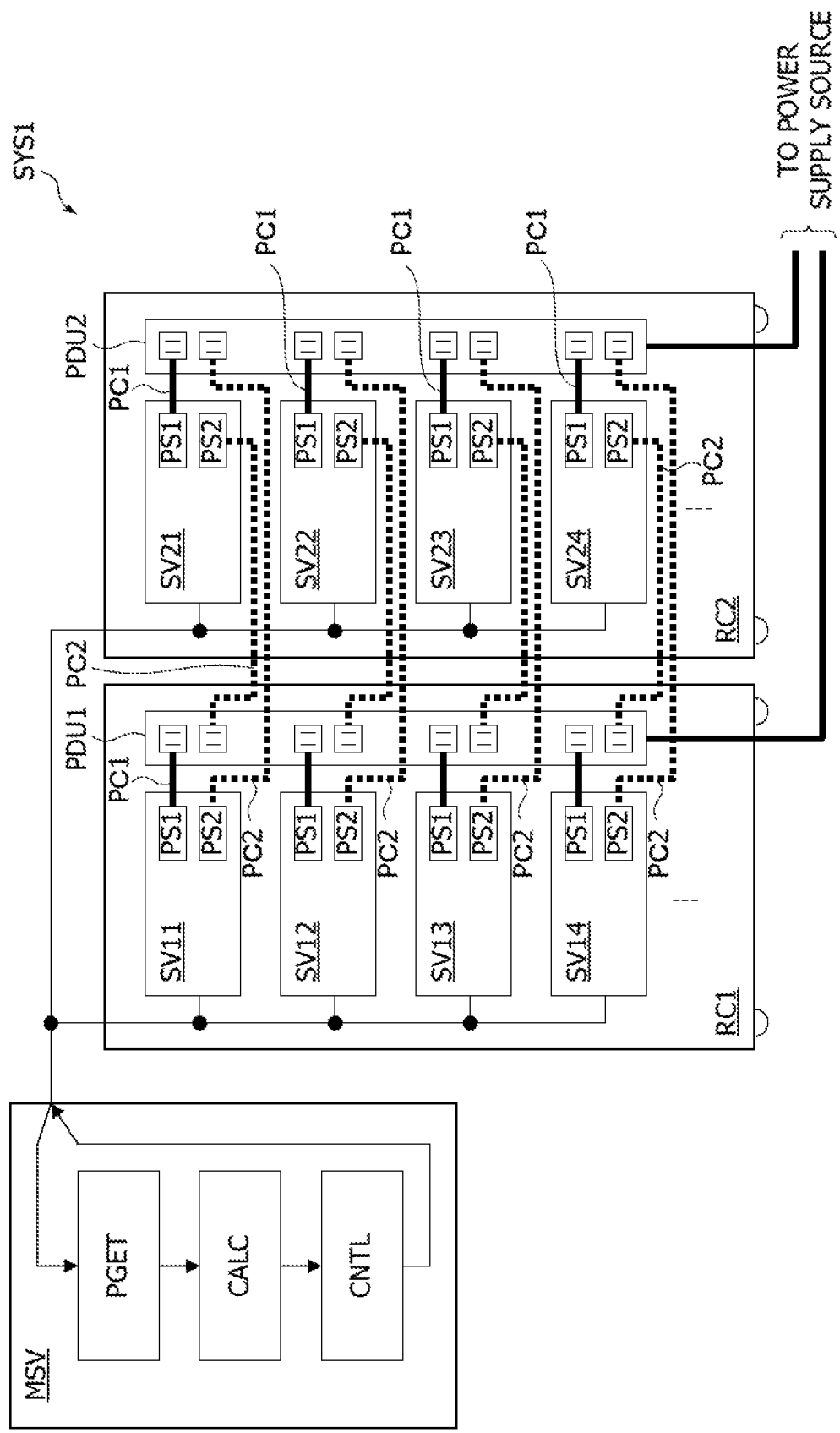
FIG. 1 is a diagram illustrating an embodiment of an information processing system, a method for controlling the information processing system, and a program for controlling a managing device.

FIG. 1 illustrates an embodiment of an information processing system, a method for controlling the information processing system, and a program for controlling a managing device. An information processing system SYS1 illustrated in FIG. 1 includes multiple racks RC (RC1 and RC2) and a managing server MSV. The racks RC are an example of enclosures.

The rack RC1 has a space for storing multiple servers SV (SV11, SV12, SV13, SV14, ... ). The rack RC1 has a power distribution unit (power strip) PDU1 configured to supply power to each of the servers SV. The rack RC2 has a space for storing multiple servers SV (SV21, SV22, SV23, SV24, ... ). The rack RC2 has a power distribution unit PDU2 configured to supply power to each of the servers SV. The power distribution units PDU (PDU1 and PDU2) receive power from a power supply device that is a transformer or the like and is a power supply source.

Each of the servers SV stored in the rack RC1 includes a power supply unit PS1 with a power supply cable PC1 to be connected to an outlet of the power distribution unit PDU1 of the rack RC1 and includes a power supply unit PS2 with a power supply cable PC2 to be connected to an outlet of the power distribution unit PDU2 of the rack RC2. Each of the servers SV stored in the rack RC2 includes a power supply unit PS1 with a power supply cable PC1 to be connected to an outlet of the power distribution unit PDU2 of the rack RC2 and a power supply unit PS2 with a power supply cable PC2 to be connected to an outlet of the power distribution unit PDU1 of the rack RC1. Hereinafter, a rack RC in which a server SV is stored is also referred to as a target rack RC, and a rack RC located adjacent to the rack RC in which the server SV is stored in also referred to as an adjacent rack RC.

Figure 2:
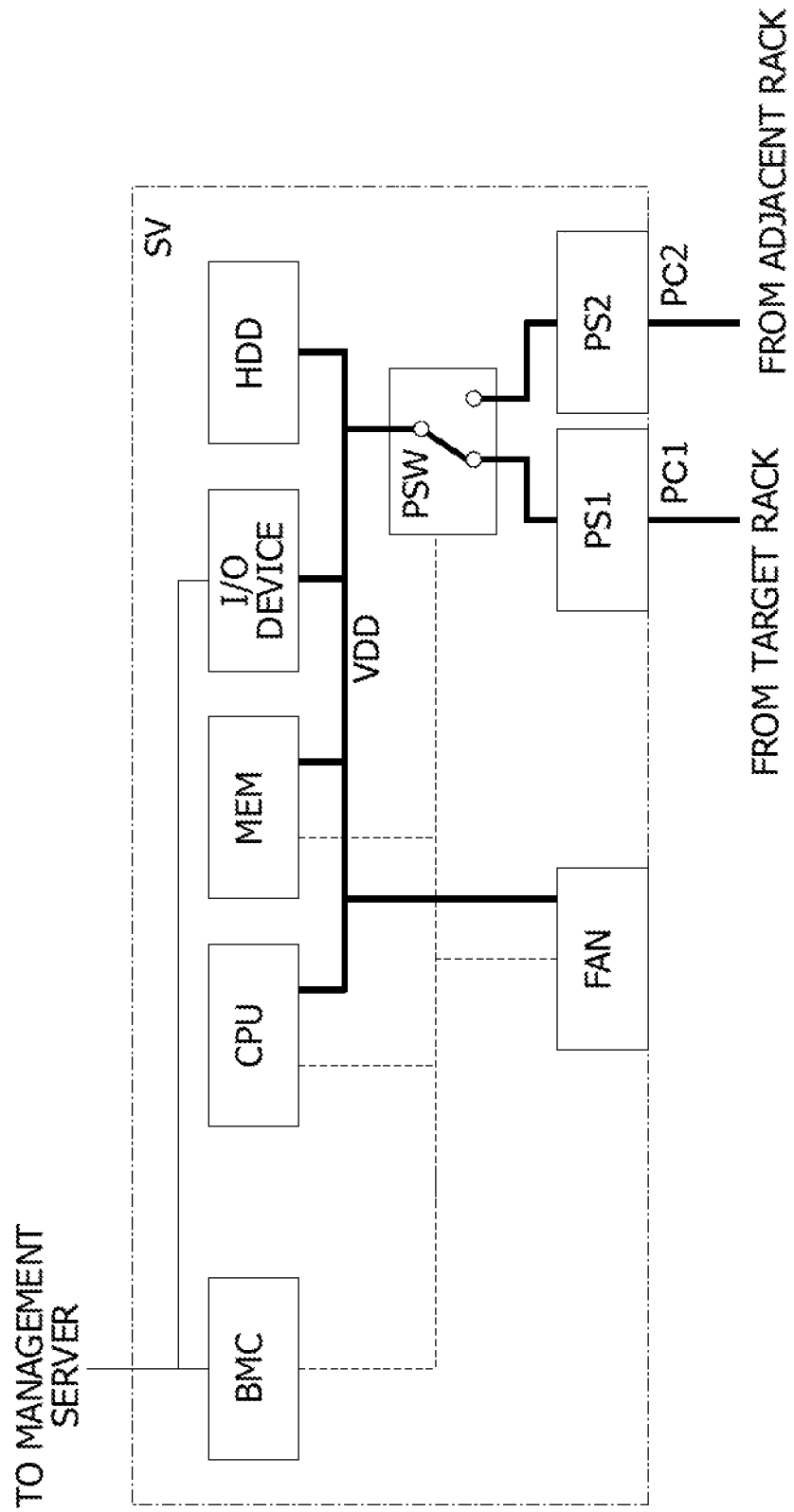
FIG. 2 is a diagram illustrating an example of each of servers illustrated in FIG. 1.

Unless otherwise limited, each of the power supply units PS2 is a redundant power supply unit to be used upon a failure of a corresponding power supply unit PS1 or the like. Each of the servers SV operates based on a power-supply voltage supplied from one of the power supply units PS1 and PS2 of the server SV. The power supply cables PC1 and PC2 are an example of power supply lines. The outlets are an example of power supply terminals. The servers SV are an example of information processing devices. An example of the servers SV is illustrated in FIG. 2.

In FIG. 1, power supply cables PC (PC1) connected to outlets of a power distribution unit PDU (PDU1 or PDU2) installed in a target rack RC are indicated by thick solid lines, while power supply cables PC (PC2) connected to outlets of the other power distribution unit PDU installed in the adjacent rack RC are indicated by thick broken lines. FIG. 1 illustrates an initial state in which the servers SV stored in the rack RC1 receive power from the power distribution unit PDU1 via the power supply units PS1 and in which the servers SV stored in the rack RC2 receive power from the power distribution unit PDU2 via the power supply units PS1.

The managing server MSV includes an acquirer PGET, a calculator CALC, and a controller CNTL. The managing server MSV is an example of a managing device configured to manage multiple servers SV. Unless otherwise limited, the managing server MSV has a configuration that is the same as or similar to that of a server SV illustrated in FIG. 2. The managing server MSV and the servers SV are coupled to each other via a local area network (LAN) or the like.

The acquirer PGET acquires values of power consumed by the servers SV from the servers SV. The calculator CALC calculates a total consumed power value or the total of values of power consumed by servers SV based on the values, acquired by the acquirer PGET, of power consumed by the servers SV for each of groups of the servers SV to which power is supplied from the power distribution units PDU. Each of the servers SV belongs to any of the server groups of the power distribution units PDU configured to supply power to the servers SV.

In the initial state illustrated in FIG. 1, the servers SV11, SV12, SV13, SV14, ... stored in the rack RC1 belong to a first group, and the servers SV21, SV22, SV23, SV24, ... stored in the rack RC2 belong to a second group. A total consumed power value that is the total of power consumed by servers SV belonging to each of the groups corresponds to the value of power supplied by each of the power distribution units PDU to servers SV. In the following description, the value (or total consumed power value) of power supplied by each of the power distribution units PDU to servers SV is referred to as a consumed power value in some cases.

If a group of which a total consumed power value exceeds a threshold PVT1 and that is referred to as an excessive group exists, the controller CNTL switches a power supply of any of servers SV belonging to the excessive group so that power is supplied from the power distribution unit PDU of the other group to the server SV. The threshold PVT1 is described later with reference to FIG. 5. Specifically, if the total consumed power value exceeds the threshold PVT1, the controller CNTL switches a power supply line PC for supplying power so that power is supplied from the other group to any of the servers SV belonging to the excessive group and thereby causes the server SV to operate.

For example, it is assumed that the total value of power consumed by the servers SV11, SV12, SV13, SV14, ... belonging to the server group of the power distribution unit PDU1 exceeds the threshold PVT1 in the initial state illustrated in FIG. 1. In this case, the controller CNTL switches a power supply of any of the servers SV11, SV12, SV13, SV14, ... so that power is supplied from the power distribution unit PDU2 to the server SV11, SV12, SV13, SV14, ... or the like to which power has been supplied from the power distribution unit PDU1. The power supply switching is repeatedly executed until the total consumed power value becomes equal to or smaller than the threshold PVT1. A method for switching the power supply is described below with reference to FIG. 2.

FIG. 2 illustrates an example of each of the servers SV illustrated in FIG. 1. Thick solid lines illustrated in FIG. 2 indicate power supply lines. Each of the servers SV includes a baseboard management controller (BMC), a processor such as a central processing unit (CPU), a memory MEM, and an input and output (I/O) device. In addition, each of the servers SV includes a hard disk drive (HDD), a power supply switch (PSW), power supply units PS1 and PS2, and a fan FAN. The CPU, the memory MEM, the I/O device, the HDD, and the fan FAN are an example of functional units that operate based on a power-supply voltage VDD. For example, the managing server MSV and the BMCs of the servers SV are designed to conform to the Intelligent Platform Management Interface (IPMI) and communicate information in accordance with the IPMI specifications.

The BMC manages operational states of the CPU, the memory MEM, the fan FAN, and the power supply switch PSW based on an instruction from the managing server MSV illustrated in FIG. 1, while the BMC, the CPU, the memory MEM, the fan FAN, and the power supply switch PSW are coupled to each other, as indicated by broken lines in FIG. 2. For example, the managing server MSV uses an application programming interface (API) to instruct the BMC to switch a power supply. For example, the BMC instructs the CPU to change a clock frequency, detects an error in data stored in the memory MEM, instructs the fan FAN to change the rotation speed of the fan FAN, and instructs the power supply switch PSW to switch the power supply. The BMC receives the power-supply voltage supplied at any time and operates.

The CPU achieves functions of the server SV by executing a program stored in the memory MEM. For example, the memory MEM is a memory module including multiple dynamic random access memory (DRAM) chips or the like. For example, the I/O device is a local area network (LAN) card attached to a Peripheral Component Interconnect (PCI) slot or the like. The HDD holds data to be processed by the CPU and the program that is transferred to the memory MEM upon the activation of the server SV. The server SV may include a solid state drive (SSD), instead of the HDD. The fan FAN is attached to an intake port or exhaust port of the server SV. The fan FAN introduces external air into the server SV and discharges heat generated from electronic components such as the CPU to the outside of the server SV.

Each of the power supply units PS1 and PS2 includes an alternating current (AC)-to-direct current (DC) converter, for example. Each of the power supply units PS1 and PS2 converts an alternating-current voltage supplied from any of the power distribution units PDU illustrated in FIG. 1 into a direct-current voltage and outputs the converted direct-current voltage as a power-supply voltage VDD to the CPU and the like. The power supply line PC1 of the power supply unit PS1 is coupled to a power distribution PDU of a target rack RC, while the power supply line PC2 of the power supply unit PS2 is coupled to a power distribution unit PDU of an adjacent rack RC. The power supply units PS1 and PS2 are an example of a power supply configured to generate a power-supply voltage VDD.

The power supply switch PSW executes a switching operation based on control by the BMC that operates based on an instruction from the managing server MSV. Then, the power supply switch PSW connects a power supply line VDD to output of the power supply unit PS1 or output of the power supply unit PS2. Specifically, the managing server MSV may control the operations of the power supply switches PSW and switch the power supplies of the servers SV via the BMCs. Each of the power supply switches PSW is an example of a power supply selector configured to select any of a power-supply voltage VDD from a power supply unit PS1 or a power-supply voltage VDD from a power supply unit PS2.

Figure 3:
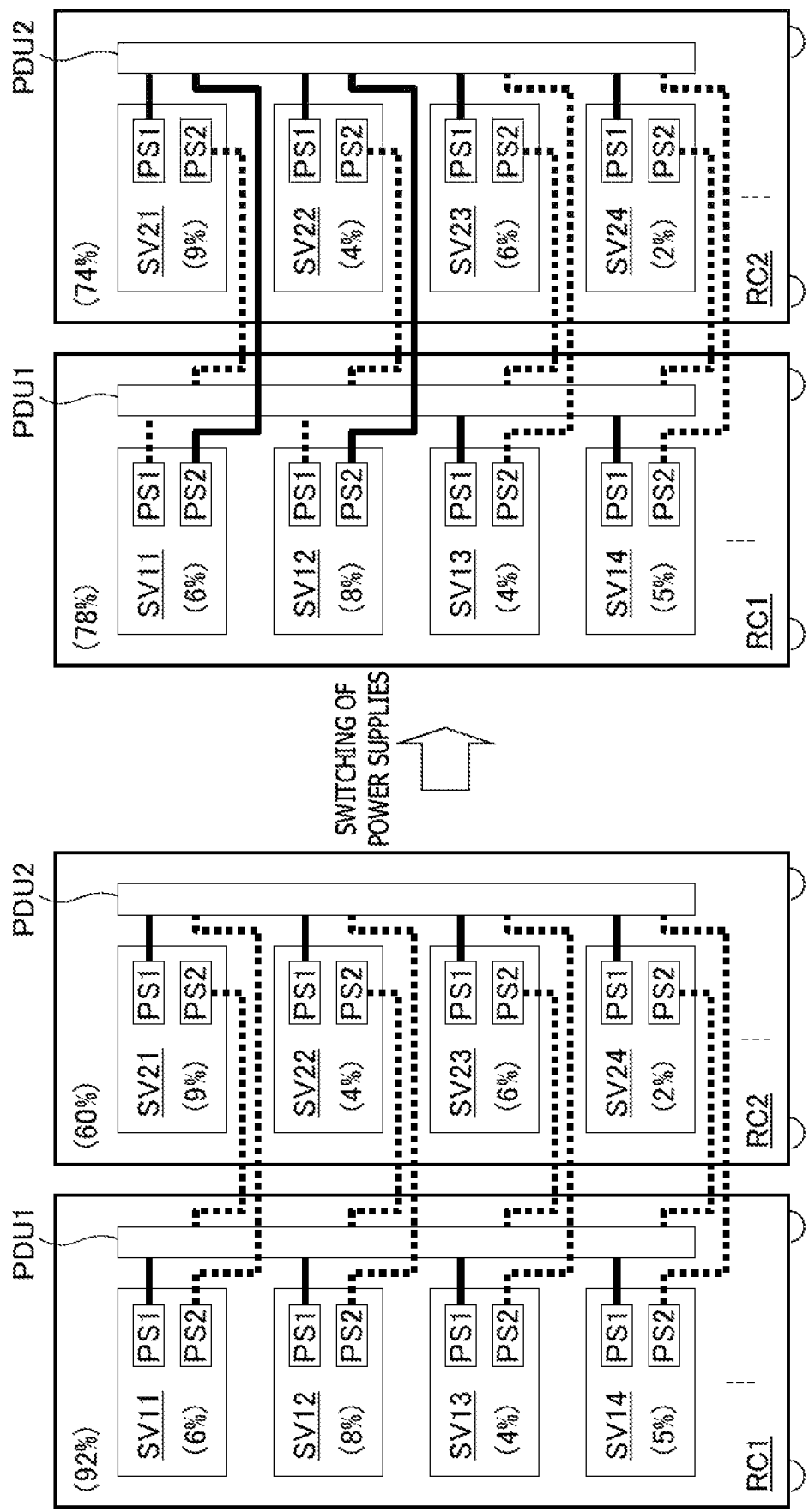
FIG. 3 is a diagram illustrating an example of operations of an information processing system illustrated in FIG. 1.

FIG. 3 illustrates an example of operations of the information processing system SYS1 illustrated in FIG. 1. A state in which power is supplied to the servers illustrated on the left side of FIG. 3 is the same as the initial state illustrated in FIG. 1.

In FIG. 3, values (6%, 8%, and the like) indicated in the servers SV indicate an example of the ratios (server power consumption rates) of the values of power consumed by the servers SV to rated power values of the power distribution units PDU. The server power consumption rates are percentages obtained by dividing values, acquired by the acquirer PGET illustrated in FIG. 1, of power consumed by the servers SV by the rated power values of the power distribution units PDU. For example, if the rated power value of the power distribution unit PDU1 is 7000 watts (W), and power consumed by the server SV11 is 420 W, the server power consumption rate of the server SV11 is 6%. The server power consumption rates are illustrated in order to simplify the description. The managing server MSV, however, may not calculate the server power consumption rates and may use power consumed by the servers SV and the rate power values of the power distribution units PDU to manage the power supplies of the servers SV.

On the left side of FIG. 3, values illustrated on the upper left sides of the racks RC1 and RC2 indicate percentages (rack power consumption rates) of values of power consumed in the racks RC1 and RC2 relative to the rated power values of the power distribution units PDU1 and PDU2. It is assumed that the rated power values of the power distribution units PDU1 and PDU2 are the same. As illustrated on the left side of FIG. 3, in the initial state, the rack power consumption rate of the rack RC1 is 92% and the rack power consumption rate of the rack RC2 is 60%.

The calculator CALC illustrated in FIG. 1 calculates a total consumed power value that is the total of power consumed by the servers SV to which power is supplied from the power distribution unit PDU1. In addition, the calculator CALC calculates a total consumed power value that is the total of power consumed by the servers SV to which power is supplied from the power distribution unit PDU2. The controller CNTL illustrated in FIG. 1 divides the total consumed power values by the rated power values of the power distribution units PDU and thereby calculates the rack power consumption rates.

The controller CNTL switches a power supply of any of servers SV to which power is supplied from a power distribution unit PDU included in a target rack RC whose rack power consumption rate exceeds the threshold PVT1 so that power is supplied to the target server SV from a power distribution unit PDU included in a rack RC whose rack power consumption rate is equal to or lower than a threshold PVT3. The power supply switching is executed until the rack power consumption rate of the target rack RC becomes equal to or lower than a threshold PVT2 that is smaller than the threshold PVT1. Servers SV, for which a power distribution unit PDU configured to supply power is switched, are selected in descending order of power consumed by the servers SV. Since the servers SV, for which the power distribution unit PDU configured to supply power is switched, are selected in descending order of power consumed by the servers, the number of times when the switching is executed until the rack power consumption rate becomes equal to or lower than the threshold PVT2 may be minimized.

For example, the thresholds PVT1, PVT2, and PVT3 are determined based on an experimental rule. For example, the threshold PVT1 is 90%, the threshold PVT2 is 80%, and the threshold PVT3 is 70%. It is desirable that the threshold PVT3 be equal to or smaller than a value obtained by subtracting the difference between the thresholds PVT1 and PVT2 from the threshold PVT2. Thus, the rack power consumption rate of a power distribution unit PDU of which the value of consumed power increases due to the power supply switching may be suppressed to a value equal to or smaller than the threshold PVT2. Thus, the values of power to be consumed by the power distribution units PDU may be equal to each other between the racks RC.

Since a power supply is switched using a power distribution unit PDU of which a rack power consumption rate is equal to or lower than the threshold PVT3 that is smaller than the threshold PVT2, it may be possible to inhibit the rack power consumption rate of a power distribution unit PDU that supplies power to servers SV whose number is increased from exceeding the threshold PVT1. As a result, the rack power consumption rates of the power distribution units PDU installed in the two racks RC between which a power supply is switched may alternately be inhibited from exceeding the threshold PVT1, and the repetitive execution of the operation of switching a power supply may be suppressed or avoided.

The controller CNTL may compare the total consumed power values with power values (for example, 6300 W and 4900 W) or 90% and 70% of the rated power values of the power distribution units PDU without using the rack power consumption rates and determine a power distribution unit PDU to which a power supply is to be switched and a power distribution unit PDU from which the power supply is to be switched. In addition, the controller CNTL may compare the total consumed power values with a power value (for example, 5600 W) or 80% of the rated power values of the power distribution units PDU and determine the completion of the power supply switching. In this case, the threshold PVT1 is 6300 W, the threshold PVT2 is 5600 W, and the threshold PVT3 is 4900 W.

The controller CNTL switches, to the power distribution unit PDU2, the power supplies of the servers SV11 and SV12 coupled to the power distribution unit PDU1 of which the rack power consumption rate is 92% (6440 W). As illustrated on the right side of FIG. 3, the power distribution unit PDU that supplies power (980 W) to be consumed by the servers SV11 and SV12 is switched from the power distribution unit PDU1 to the power distribution unit PDU2. The rack power consumption rate of the power distribution unit PDU1 becomes 78% (5460 W). The rack power consumption rate of the power distribution unit PDU2 becomes 74% (5180 W).

As illustrated in FIG. 3, since the power supply switching is managed, the performance of the information processing system SYS1 may be maintained at a level before the power supply switching, and the value of power to be consumed by the power distribution unit PDU1 of the rack RC1 may be suppressed to a value equal to or smaller than the rated power value of the power distribution unit PDU1. Power to be supplied to the servers SV may be switched between the racks RC1 and RC2 without the dependency of power to be supplied to the servers SV on the racks RC in which the servers SV are stored. Thus, a larger number of servers SV may be stored in the racks RC, and the densities at which the servers SV are stored in the racks RC may be increased, compared with conventional techniques. In addition, the performance of the information processing system SYS1 may be improved.

Traditionally, the number of servers SV to be stored in a rack RC has been set so that the total of rated power values of the servers SV stored in the rack RC does not exceed a rated power value of a power distribution unit PDU. In the information processing system SYS1 illustrated in FIG. 1, however, the power distribution units PDU that supply power to the servers SV may be switched. Thus, the servers SV may be set so that the total of rated power values of servers SV stored in each of the racks RC exceeds a rated power value of a power distribution unit PDU of the rack RC. For example, if the rated power value of the power distribution unit PDU1 is 7000 W, the total of rated power values of servers SV stored in each of the racks RC is set to 10500 W that is 1.5 times as large as the rated power value of the power distribution unit PDU1. In this case, the number of servers SV able to be stored in each of the racks RC may be 1.5 times as large as those in the conventional techniques.

Figure 4:
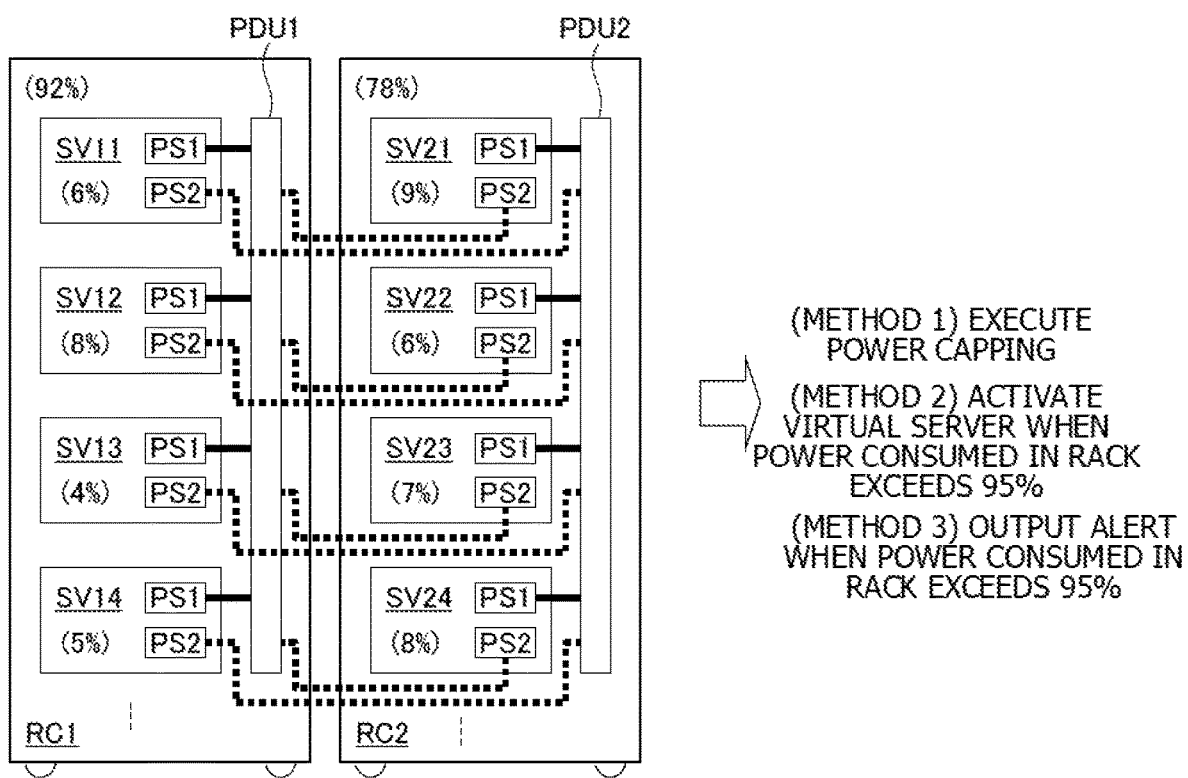
FIG. 4 is a diagram illustrating another example of the operations of the information processing system illustrated in FIG. 1.

FIG. 4 illustrates another example of the operations of the information processing system SYS1 illustrated in FIG. 1. A state in which power is supplied to the servers SV stored in the rack RC1 illustrated in FIG. 4 is the same as the initial state illustrated in FIG. 3, while a state in which power is supplied to the servers SV stored in the rack RC2 illustrated in FIG. 4 is different from the initial state illustrated in FIG. 3. The rack power consumption rate of the rack RC2 is 78%.

If the rack power consumption rate of the power distribution unit PDU2 to which a power supply is to be switched exceeds the threshold PVT3 (70%), the controller CNTL does not execute an operation of switching the power supply from the power distribution unit PDU1 to the power distribution unit PDU2. In this case, the managing server MSV executes any of the following three methods 1 to 3 in order to inhibit the value of power to be consumed by the power distribution unit PDU1 from exceeding the rate power value of the power distribution unit PDU1.

In the method 1, the managing server MSV causes at least any of servers SV stored in a rack RC whose rack power consumption rate exceeds the threshold PVT1 to execute power capping. For example, the managing server MSV instructs each of the servers SV stored in the rack RC whose rack power consumption rate exceeds the threshold PVT1 to execute the power capping to set values of power to be consumed by the servers SV to 97% of the rated power values of the servers SV, and each of the BMCs of the servers SV instructed to execute the power capping reduces at least one of a power-supply voltage and a clock frequency and thereby reduces power to be consumed.

In the method 2, when the rack power consumption rate of a rack RC exceeds 95%, the managing server MSV activates a virtual server in any of servers stored in the rack RC whose rack power consumption rate exceeds 95%. Then, processes executed in the servers SV stored in the rack RC whose rack power consumption rate exceeds 95% are switched to processes to be executed by the virtual server.

In the method 3, when the rack power consumption rate of a rack RC exceeds 95%, the managing server MSV outputs an alert in order to notify a higher-level device for the information processing system SYS1, an administrator, or the like that the value of power to be consumed in the rack RC is likely to exceed the rate power value.

Even if the rack power consumption rate of the power distribution unit PDU2 to which a power supply is to be switched exceeds the threshold PVT3 (70%), the managing server MSV may execute any of the methods 1 to 3 to inhibit the value of power consumed by the power distribution unit PDU1 from exceeding the rated power value of the power distribution unit PDU1.

Figure 5:
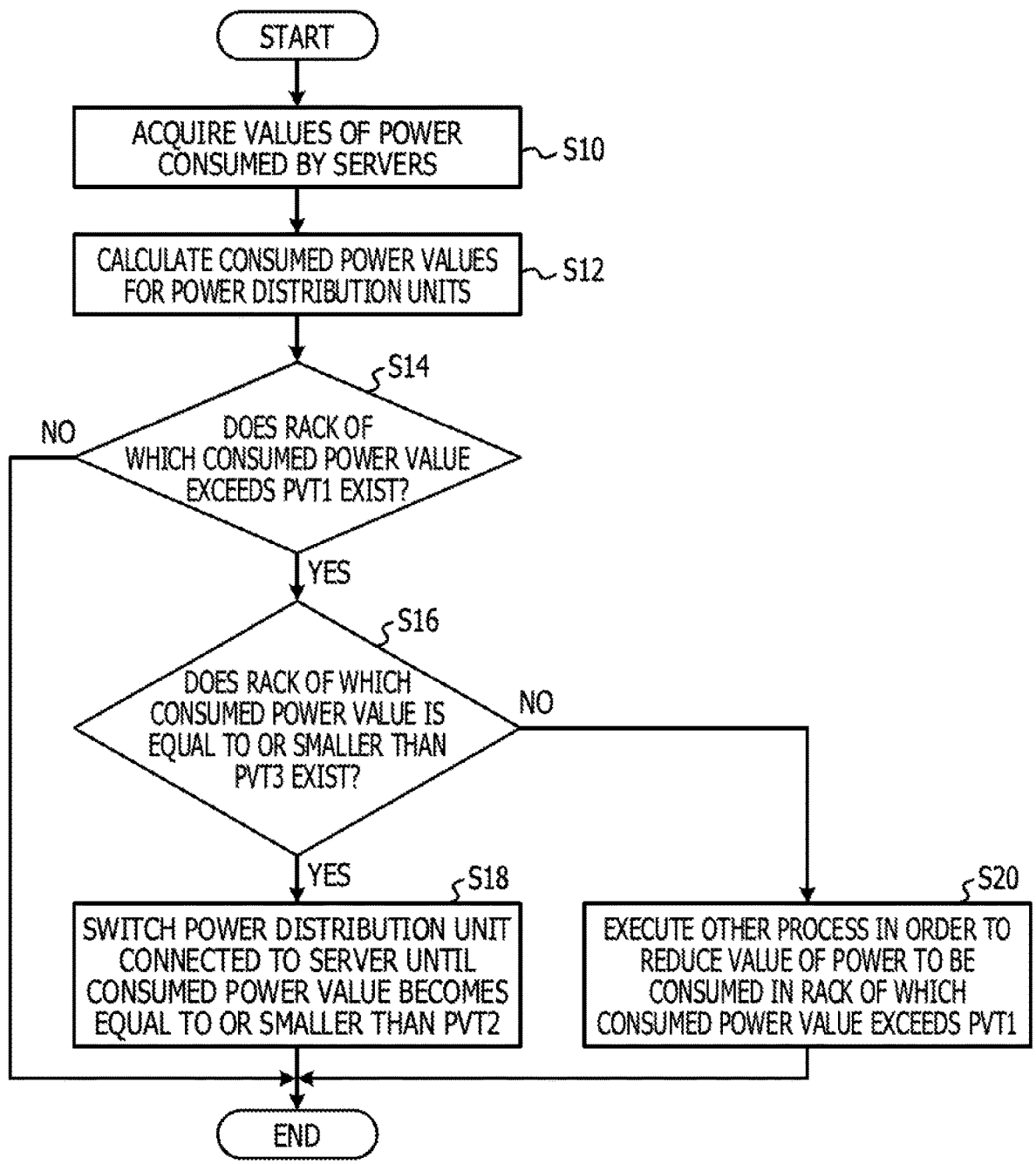
FIG. 5 is a diagram illustrating an example of operations of a managing server illustrated in FIG. 1.

FIG. 5 illustrates an example of operations of the managing server MSV illustrated in FIG. 1. Operations illustrated in FIG. 5 are achieved by a control program executed by the managing server MSV and are repeatedly executed at predetermined time intervals (of, for example, 10 seconds). Specifically, FIG. 5 illustrates an example of the method for controlling the information processing system and the program for controlling the managing device. The control program is stored in a memory included in the managing server MSV. The control program is executed by a processor such as a CPU included in the managing server MSV.

First, in S10, the acquirer PGET of the managing server MSV acquires values of power consumed by the servers SV stored in all the racks RC included in the information processing system SYS1. Next, in S12, the calculator CALC of the managing server MSV calculates values (or the total consumed power values) of power consumed by the power distribution units PDU based on the values, acquired in S10, of power consumed by the servers SV.

Then, in S14, the controller CNTL of the managing server MSV determines whether or not a rack RC of which the value of consumed power exceeds the threshold PVT1 exists. Specifically, the controller CNTL determines whether or not the power supply switching is to be executed. If the rack RC of which the value of consumed power exceeds the threshold PVT1 exists, the controller CNTL causes the process to proceed to S16 in order to reduce the value of power to be consumed by the power distribution unit PDU included in the rack RC. If the rack RC of which the value of consumed power exceeds the threshold PVT1 does not exist, the controller CNTL determines that the power distribution units PDU are able to consume more power, and the controller CNTL terminates the process.

In S16, the controller CNTL of the managing server MSV determines whether or not a rack RC of which the value of consumed power is equal to or smaller than the threshold PVT3 exists. Specifically, the controller CNTL selects the rack RC to which a power supply is to be switched. If the rack RC of which the value of consumed power is equal to or smaller than the threshold PVT3 exists, the controller CNTL causes the process to proceed to S18 in order to reduce the value of power to be consumed by the power distribution unit PDU of the rack RC. If the rack RC of which the value of consumed power is equal to or smaller than the threshold PVT3 does not exist, the controller CNTL determines that it is difficult to switch the power distribution unit PDU configured to supply power to servers SV, and the controller CNTL causes the process to proceed to S20.

In S18, the controller CNTL of the managing server MSV switches the power distribution unit PDU supplying power to the servers SV until the value of power consumed by the power distribution unit PDU becomes equal to or smaller than the threshold PVT2. Then, the controller CNTL terminates the process. As a result, in the rack RC in which the value of power consumed by the power distribution unit PDU exceeds the threshold PVT1, the value of power to be consumed by the power distribution unit PDU may be reduced to a value equal to or smaller than the threshold PVT2. There is the difference between the threshold PVT1 and the threshold PVT2. Thus, even if power consumed by servers SV tends to increase, it may be possible to inhibit the value of power consumed by the power distribution unit PDU from exceeding the threshold PVT1 immediately after the switching of the power distribution unit PDU. As a result, it may be possible to inhibit the value of power consumed by the power distribution unit PDU from exceeding the rated power value of the power distribution unit PDU.

In S20, the managing server MSV executes another process (or any of the aforementioned methods 1, 2, and 3) of reducing the value of power to be consumed by the power distribution unit PDU of which the value of consumed power exceeds the threshold PVT1. Then, the managing server MSV terminates the process. For example, the managing server MSV causes at least any of the servers SV stored in the rack RC including the power distribution unit PDU of which the value of consumed power exceeds the threshold PVT1 to execute the power capping. Thus, even if the power supply of the server SV is not switched, it may be possible to inhibit the value of power consumed by the power distribution unit PDU from exceeding the rated power value of the power distribution unit PDU.

In the embodiment illustrated in FIGS. 1 to 5, the values of power consumed by the power distribution units PDU do not exceed the rated power values of the power distribution units PDU, and the densities at which the servers SV are stored in the racks RC may be improved. A larger number of servers SV may be stored in each of the racks RC, and the performance of the information processing system SYS1 may be improved, compared with the conventional techniques. Since power supplies are switched using a power distribution unit PDU of which the value of consumed power is equal to or smaller than the threshold PVT3 that is smaller than the threshold PVT2, and the repetitive execution of the operation of switching a power supply between the two racks RC may be suppressed or avoided. Since the threshold PVT3 is equal to or smaller than a value obtained by subtracting the difference between the thresholds PVT1 and PVT2 from the PVT2, it may be possible to suppress, to a value equal to or smaller than the threshold PVT2, the rack power consumption rate of a power distribution unit PDU of which the value of consumed power increases due to the power supply switching. As a result, the values of power consumed by the power distribution units PDU may be equal to each other between the racks RC. Since servers SV, for which a power distribution PDU configured to supply power is switched, are selected in descending order of power consumed by the servers SV, it may be possible to minimize the number of times when the switching is executed until the rack power consumption rate of the power distribution unit PDU becomes equal to or lower than the threshold PVT2. If the value of power consumed by an adjacent rack RC exceeds the threshold PVT3, the operation of switching a power supply is not executed and the power capping is executed or the virtual server is activated. Thus, it may be possible to inhibit the value of power consumed by a power distribution unit PDU whose rack power consumption rate exceeds the threshold PVT1 from exceeding the rated power value of the power distribution unit PDU, and a reduction in the reliability of the information processing system SYS1 may be suppressed or avoided.

Figure 6:
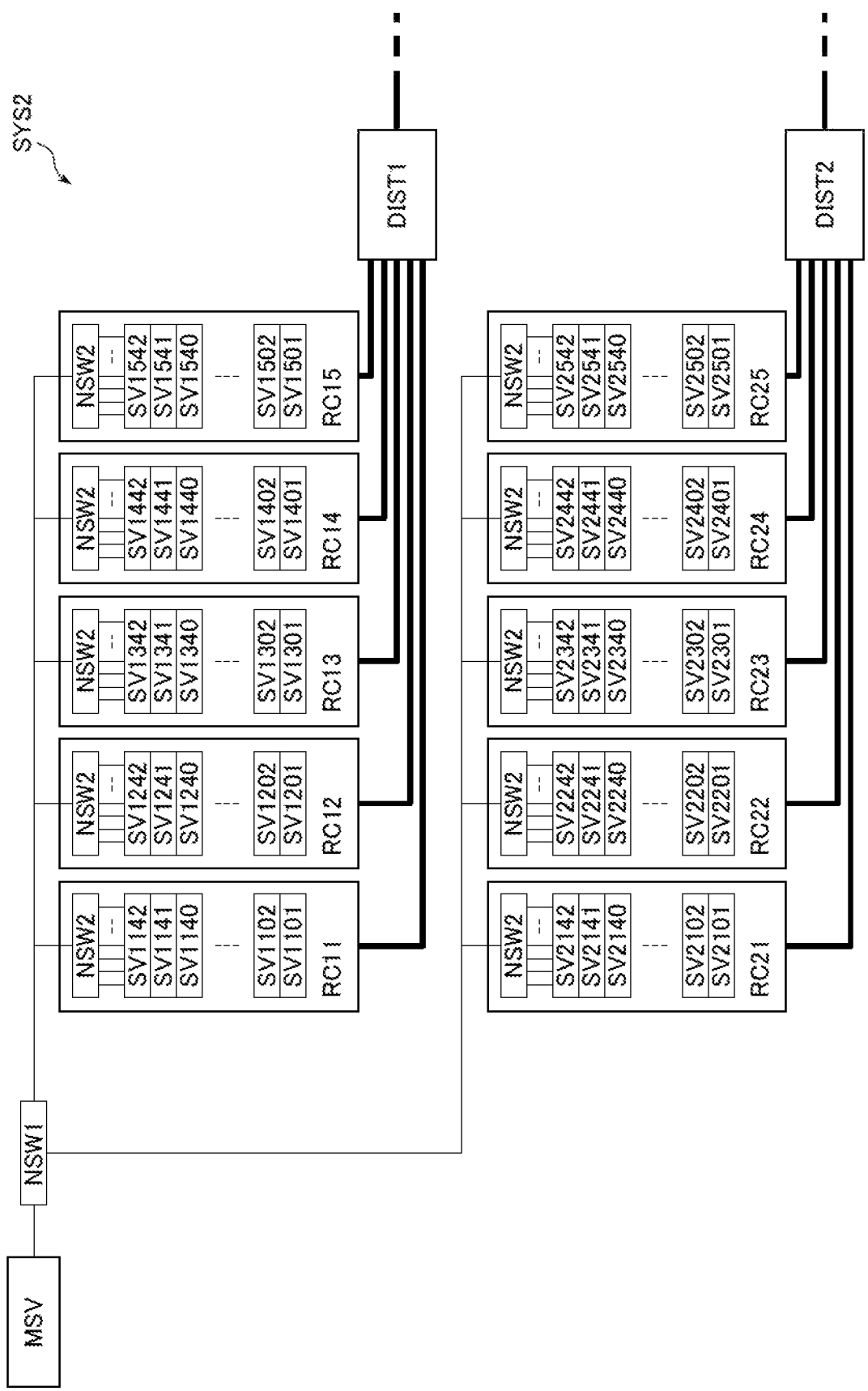
FIG. 6 is a diagram illustrating another embodiment of the information processing system, the method for controlling the information processing system, and the program for controlling the managing device.

FIG. 6 illustrates another embodiment of the information processing system, the method for controlling the information processing system, and the program for controlling the managing device. Elements that are the same as or similar to the elements described in the embodiment illustrated in FIG. 1 are indicated by the same reference symbols as those illustrated in FIG. 1, and a detailed description thereof is omitted.

An information processing system SYS2 illustrated in FIG. 6 includes multiple racks RC (RC11, RC12, RC13, RC14, RC15, RC21, RC22, RC23, RC24, and RC25), distribution boards DIST1 and DIST2, and a managing server MSV. The racks RC11, RC12, RC13, RC14, and RC15 receive power supplied from the distribution board DIST1. The racks RC21, RC22, RC23, RC24, and RC25 receive power supplied from the distribution board DIST2.

The upper digits of the two-digit numbers provided to the racks RC indicate numbers of rows in which rack groups are arranged in a horizontal direction in FIG. 6, while the lower digits of the two-digit numbers provided to the racks RC indicate numbers of columns in which rack groups are arranged in a vertical direction in FIG. 6. Specifically, the two-digit numbers provided to the racks RC indicate the arrangement of the racks RC in a data center or the like in which the information processing system SYS2 is built. Hereinafter, the two-digit numbers of the racks RC are also referred to as rack numbers. The number of racks RC included in the information processing system SYS2 is not limited to 10. Each of the racks RC includes multiple servers SV and a network switch NSW2 coupled to the servers SV. The configurations of the servers SV are the same as or similar to the configuration illustrated in FIG. 2. Each of the servers SV includes a power supply switch PSW and a BMC for controlling the power supply switch PSW.

Upper two digits of four-digit numbers provided to the servers SV indicate the rack numbers, while lower two digits of the four-digit numbers provided to the servers SV indicate rack positions that are the positions of the servers SV in the racks RC. In an example illustrated in FIG. 6, each of the racks RC has a space in which 42 servers SV are able to be stored.

The managing server MSV is coupled to the servers SV of the racks RC via a network switch NSW1 and the network switches NSW2. If the managing server MSV and the servers SV are coupled to each other via a local area network (LAN), the network switches NSW1 and NSW2 are LAN switches.

The managing server MSV has a configuration that is the same as or similar to that of the server SV illustrated in FIG. 2. The managing server MSV transmits and receives packets via the network switches NSW1 and NSW2 and acquires the values of power consumed by the servers SV and information indicating the states of the power supply switches PSW of the servers SV. The managing server MSV transmits and receives packets via the network switches NSW1 and NSW2, notifies the servers SV of information indicating instructions to switch the power supply switches PSW, and notifies the servers SV of instructions to execute the power capping. The managing server MSV and the BMCs of the servers SV communicate information in accordance with the IPMI specifications. The managing server MSV uses an API to instruct the BMCs to switch power supplies of the servers SV.

Figure 7:
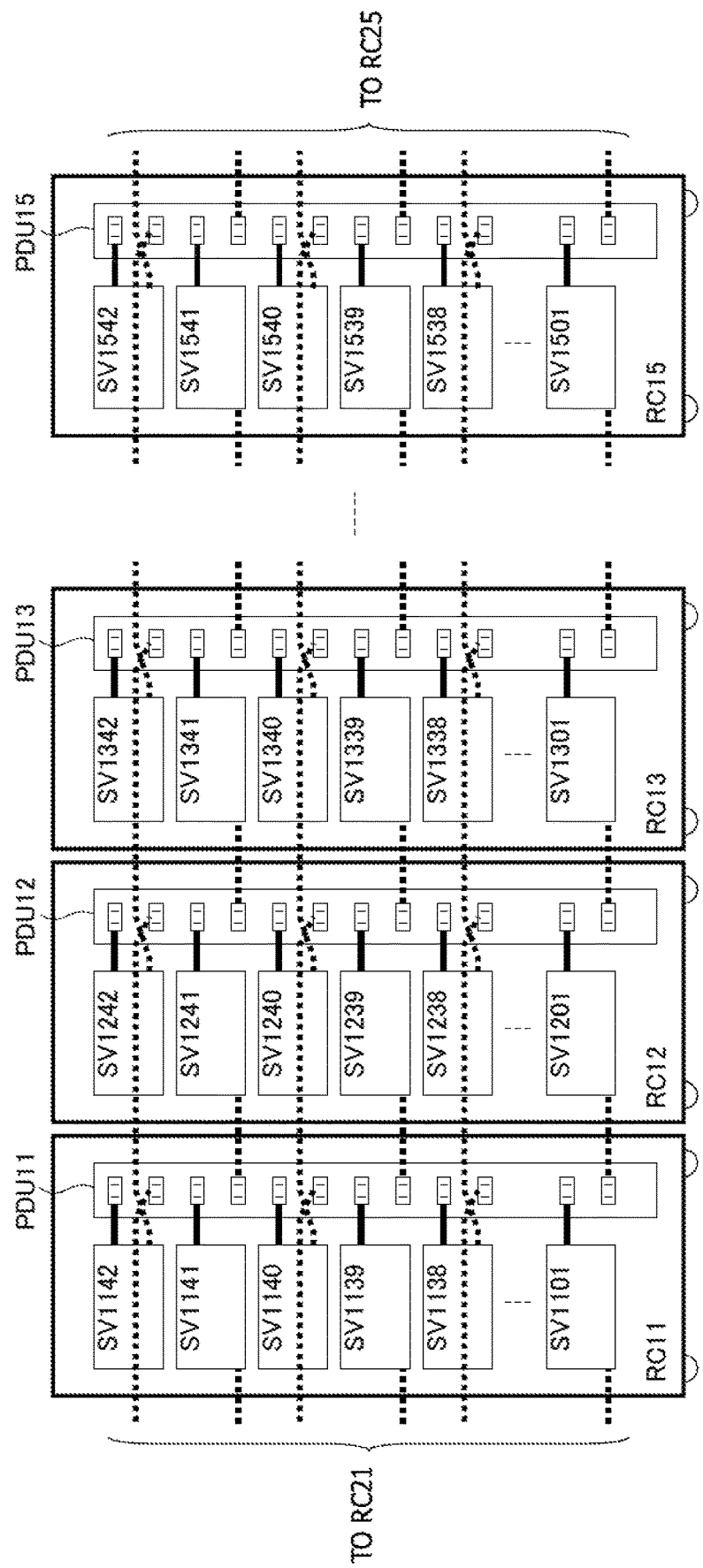
FIG. 7 is a diagram illustrating an example of connections of power supplies between racks illustrated in FIG. 6.

FIG. 7 illustrates an example of connections of the power supplies between the racks RC illustrated in FIG. 6. Each of the servers SV stored in the racks RC is coupled to a power distribution unit PDU of a target rack RC and a power distribution unit PDU of any of two racks RC located adjacent to the target rack RC. As illustrated in FIG. 2, a power supply line of a power supply unit PS1 of each of the servers SV is coupled to a power distribution unit PDU of a target rack RC, while a power supply line of a power supply unit PS2 of each of the servers SV is coupled to a power distribution unit PDU of an adjacent rack RC. Servers SV to which power is supplied from a single power distribution unit PDU belong to a single group. Specifically, each of the servers SV belongs to any of server groups of the power distribution units PDU configured to supply power. In FIG. 7, power supply lines of the power supply units PS1 are indicated by thick solid lines, while power supply lines of the power supply units PS2 are indicated by thick broken lines.

In the example illustrated in FIG. 7, power supply units PS2 of servers SV whose last digits are even numbers are coupled to racks RC located adjacent to the target racks RC on the right sides of the target racks RC, while power supply units PS2 of servers SV whose last digits are odd numbers are coupled to racks RC located adjacent to the target racks RC on the left sides of the target racks RC. Power supply units PS2 of servers SV that are stored in the rack RC11 located at an edge and whose last digits are odd numbers are coupled to the power distribution unit PDU of the rack R21 illustrated in FIG. 6, while power supply units PS2 of servers SV that are stored in the rack RC15 located at the other edge and whose last digits are even numbers are coupled to the power distribution unit PDU of the rack RC25 illustrated in FIG. 6.

In the racks RC21 to RC25 illustrated in FIG. 6, power supplies are connected in the same manner as the connections illustrated in FIG. 7. Power supply units PS2 of servers SV that are stored in the rack RC21 located at the edge and whose last digits are even numbers are coupled to the power distribution unit PDU11 of the rack RC11. Power supply units PS2 of servers SV that are stored in the rack RC25 located at the other edge and whose last digits are odd numbers are coupled to the power distribution unit PDU15 of the rack RC15.

In FIG. 7, each of power supplies of servers SV stored in each of the racks RC is coupled to either a power distribution unit PDU of a rack RC located adjacent to the target rack RC on one side of the target rack RC or a power distribution unit PDU of a rack RC located adjacent to the target rack RC on the other side of the target rack RC. Thus, power may be supplied to servers SV stored in each of the racks RC from any of two adjacent racks RC. Power to be consumed by the power distribution units PDU of the racks RC in which the servers SV are stored may be efficiently distributed, compared with a case where power supplies of servers SV stored in each of the racks RC are switched using a rack RC located adjacent to the target rack RC on one side of the target rack RC.

Figure 8:
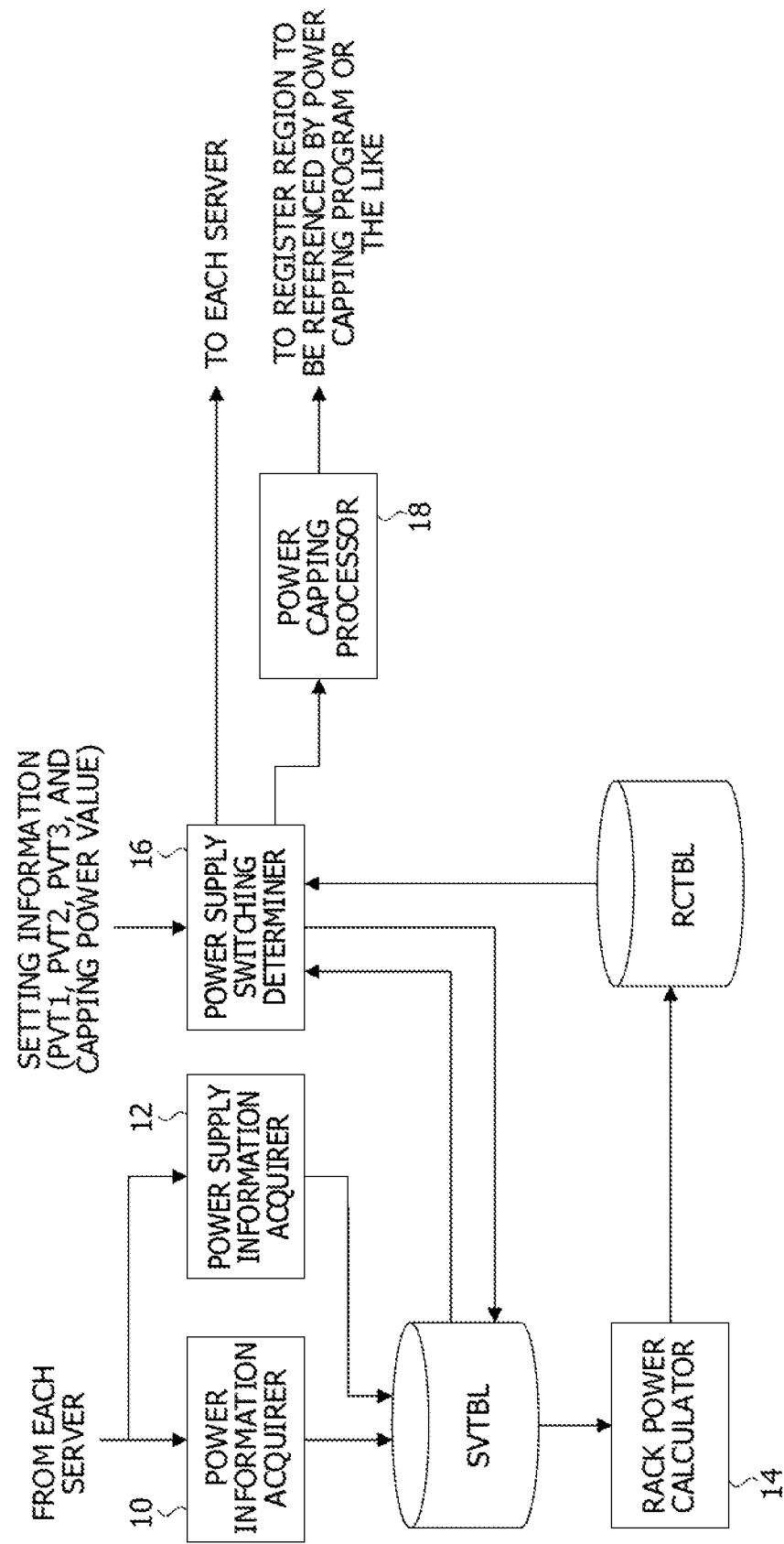
FIG. 8 is a diagram illustrating an example of functional blocks of the managing server illustrated in FIG. 6.

FIG. 8 illustrates an example of functional blocks of the managing server MSV illustrated in FIG. 6. The managing server MSV includes, as functional blocks, a power information acquirer 10, a power supply information acquirer 12, a rack power calculator 14, a power supply switching determiner 16, and a power capping processor 18. The managing server MSV includes a server management table SVTBL and a rack management table RCTBL. The power information acquirer 10, the power supply information acquirer 12, the rack power calculator 14, the power supply switching determiner 16, and the power capping processor 18 may be achieved by the control program executed by the managing server MSV or may be achieved by hardware of the managing server MSV.

The power information acquirer 10 acquires values of power consumed by the servers SV from the BMCs of the servers SV at predetermined time intervals and causes the acquired consumed power values and times and dates when the consumed power values were acquired to be stored in the server management table SVTBL. The power information acquirer 10 is an example of an acquirer configured to acquire consumed power values from multiple servers SV.

The power supply information acquirer 12 acquires, from the BMCs of the servers SV, power supply information indicating the racks RC to which the power supply units PS1 and PS2 of the servers SV are coupled and causes the acquired power supply information to be stored in the server management table SVTBL. An example of the server management table SVTBL is illustrated in FIG. 9.

The rack power calculator 14 calculates values of power consumed by the power distribution units PDU of the racks RC, based on the power supply information stored in the server management table SVTBL and the values, stored in the server management table SVTBL, of power consumed by the servers SV and causes the calculated consumed power values to be stored in the rack management table RCTBL. Every time the server management table SVTBL is updated, the rack power calculator 14 calculates values of power consumed by the power distribution units PDU of the racks RC and causes the calculated consumed power values to be stored in the rack management table RCTBL. The rack power calculator 14 is an example of a calculator configured to calculate, based on the values of power consumed by multiple servers SV, a total consumed power value that is the total of values of power consumed by servers SV belonging to each of power distribution unit groups. An example of the rack management table RCTBL is illustrated in FIG. 9.

The power supply switching determiner 16 determines the switching of power supplies based on information on various settings, the power supply information stored in the server management server SVTBL, the values, stored in the server management server SVTBL, of power consumed by the servers SV, and the values, stored in the rack management table RCTBL, of power consumed in the racks RC. The setting information includes the thresholds PVT1, PVT2, and PVT3 described with reference to FIG. 5 and a capping power value that is the value of power consumed in a rack RC in which the power capping is started. The setting information may include, instead of the capping power value, a capping power rate obtained by dividing the value of power consumed in the rack RC in which the power capping is started by the rated power value of the power distribution unit PDU of the rack RC. For example, the setting information is held in a storage unit that is included in the managing server MSV and is a register, a read only memory (ROM), or the like.

The power supply switching determiner 16 determines, based on information stored in the rack management table RCTBL, whether or not a power distribution unit PDU of which the value of consumed power exceeds the threshold PVT1 exists. If the power distribution unit PDU of which the value of consumed power exceeds the threshold PVT1 exists, the power supply switching determiner 16 outputs, to a target server SV among servers SV to which power is supplied from the power distribution unit PDU, an instruction to switch the supply of power to the target server SV to another power distribution unit PDU. For example, the power supply switching determiner 16 transmits, to the BMC of the target server SV, a control packet including the instruction to switch the supply of power. An example of the control packet is illustrated in FIG. 10. Then, the power supply switching determiner 16 updates the server management table SVTBL based on details of the power supply switch instruction output to the target server SV. The BMC that received the control packet including the power supply switch instruction controls the power supply switch PSW illustrated in FIG. 2 and switches a power supply unit outputting a power-supply voltage VDD to the CPU and the like. The power supply switching determiner 16 is an example of a controller configured to switch a power supply switch PSW of any of multiple servers SV so that power is supplied from the power supply unit PS2 of the server SV if the value of consumed power exceeds the threshold PVT1.

Alternatively, if the power distribution unit PDU of which the value of consumed power exceeds the threshold PVT1 exists, the power supply switching determiner 16 outputs, to the power capping processor 18, the capping power value included in the setting information and information indicating a server SV that executes the power capping. The power capping processor 18 causes the capping power value received from the power supply switching determiner 16 and the information indicating the server SV that executes the power capping to be stored in a register region to be referenced by a power capping program for controlling the power capping or the like. The power capping program causes the server SV targeted for the power capping to execute the power capping, based on the information stored in the register region or the like. An example of the operations of the managing server MSV is described with reference to FIG. 11.

FIG. 9 illustrates an example of the server management table SVTBL illustrated in FIG. 8 and the rack management table RCTBL illustrated in FIG. 8.

The server management table SVTBL has, for each of the servers SV, regions for storing a server name, a storage rack name, an intra-rack position, a device name, a serial number, an acquisition time and date, power supply connection racks, connection states, and a consumed power value.

In the region for server names, information that identifies the servers SV is stored. In the region for storage rack names, information that identifies the racks RC in which the servers SV are stored is stored. In the region for intra-rack positions, information that indicates the positions of the servers SV in the racks RC is stored. In the region for device names, information that indicates product names of the servers SV is stored. In the region for serial numbers, numbers specific to the servers SV, such as serial numbers, are stored.

In the region for acquisition times and dates, times and dates when the power information acquirer 10 illustrated in FIG. 8 acquired consumed power values are stored. In upper regions of the region for power supply connection racks, information that identifies racks RC including power distribution units PDU that supply power to the power supply units PS1 of the servers SV is stored. In lower regions of the region for power supply connection racks, information that identifies racks RC including power distribution units PDU that supply power to the power supply units PS2 of the servers SV is stored.

In the region for connection states, information that indicates switching states of the power supply switches PSW of the servers SV illustrated in FIG. 2 is stored. Upper regions of the region for connection states indicate connection states of the power supply units PS1, while lower regions of the region for connection states indicate connection states of the power supply units PS2. "EN" indicates that a server SV operates using a power-supply voltage VDD generated by a power supply unit PS, while "DIS" indicates that a server SV does not use a power-supply voltage VDD. In the region for consumed power values, values (watts (W)), acquired by the power information acquirer 10 illustrated in FIG. 8, of power consumed by the servers SV are stored.

The information that indicates the server names, the storage rack names, the intra-rack positions, the device names, the serial numbers, and the power supply connection racks is set in the server management table SVTBL upon or before the activation of the information processing system SYS2. The information that indicates the acquisition times and dates and the consumed power values are set by the power information acquirer 10 illustrated in FIG. 8. The information that indicates the connection states is set by the power supply information acquirer 12 illustrated in FIG. 8 and the power supply switching determiner 16 illustrated in FIG. 8.

The rack management table RCTBL has, for each of the racks RC, regions for storing a rack name and the value of power consumed by a power distribution unit PDU. In the region for rack names, information that identifies the racks RC is stored. In the region for values of power consumed by the power distribution units PDU, information that indicates values (or total consumed power values), calculated by the power calculator 14 illustrated in FIG. 8, of power consumed by the power distribution units PDU of the racks RC is stored.

FIG. 10 illustrates an example of the structure of the packet transmitted by the managing server MSV illustrated in FIG. 8 to the BMC. A packet illustrated in FIG. 10 is a so-called Transmission Control Protocol (TCP) packet. In a region for a source IP address, an IP address of the managing server MSV is stored. In a region for a destination IP address, an IP address of the server SV that is a destination of the packet is stored.

In top 8 bits of a region for an option, information to be used to switch the state of the power supply switch PSW illustrated in FIG. 2 is stored. If the target server SV consumes power supplied from the power distribution unit PDU of the target rack RC, the managing server MSV transmits the packet storing "00000100" in the top 8 bits of the option portion to the BMC of the target server SV in which the power supply is switched. In this case, the managing server MSV sets "EN" and "DIS" in upper and lower regions of a region for connection states of the target server SV in the server management table SVTBL illustrated in FIG. 9. The BMC of the server SV that received the packet controls the power supply switch PSW illustrated in FIG. 2, connects the power supply line VDD to output of the power supply unit PS1, and switches the source of supplying power from the power distribution unit PDU of the target rack RC to a power distribution unit PDU of an adjacent rack RC.

On the other hand, if the target server SV consumes power supplied from a power distribution unit PDU of an adjacent rack RC, the managing server MSV transmits the packet storing "00000101" in the top 8 bits of the option portion to the BMC of the target server SV in which the power supply is switched. In this case, the managing server MSV sets "DIS" and "EN" in the upper and lower regions of the region for the connection states of the target SV in the server management table SVTBL. The BMC of the server SV that received the packet controls the power supply switch PSW, connects the power supply line VDD to output of the power supply unit PS2, and switches the source of supplying power from the power distribution unit PDU of the adjacent rack RC to the power distribution unit PDU of the target rack RC.

Figure 11:
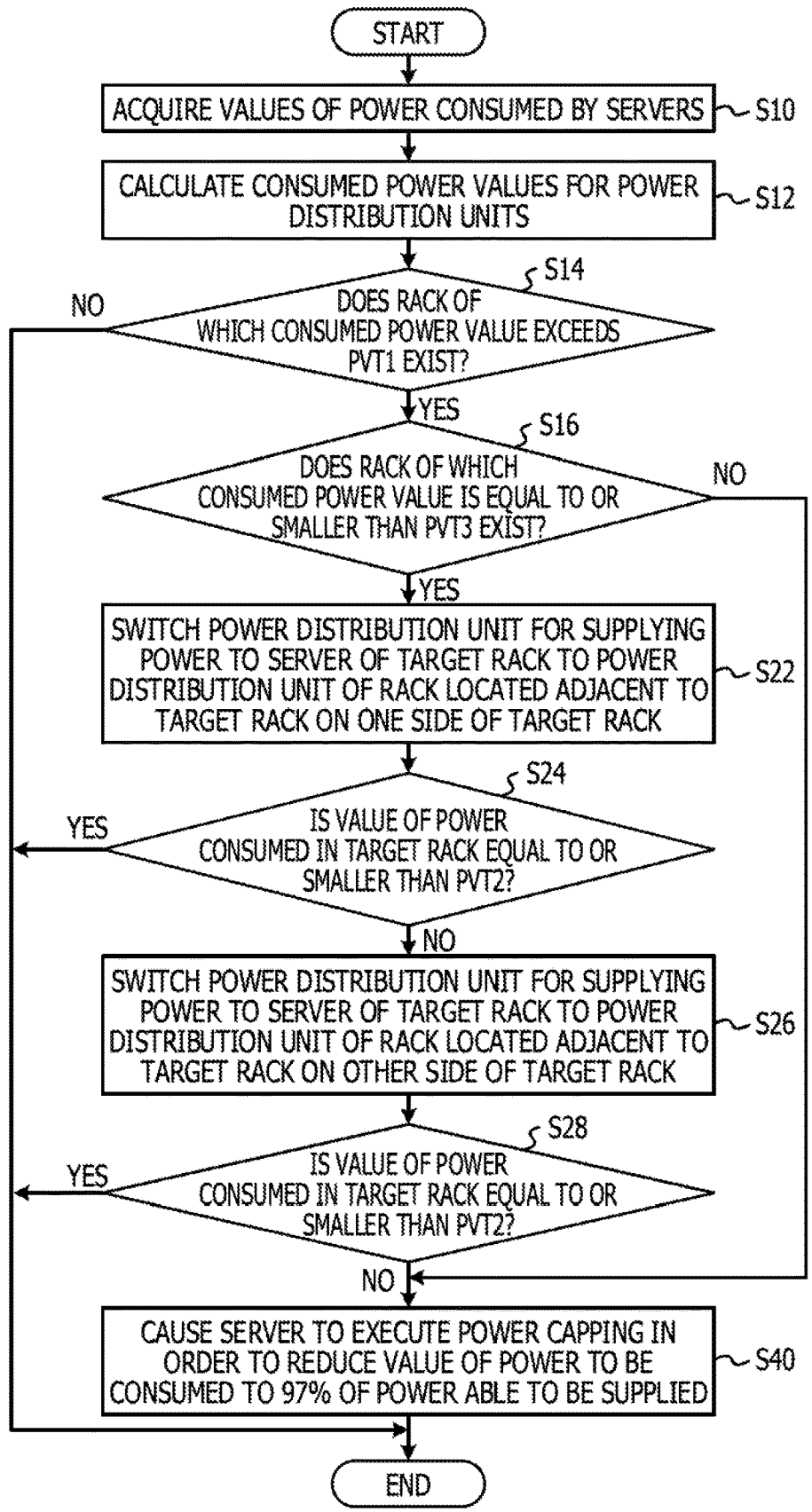
FIG. 11 is a diagram illustrating an example of operations of the managing server illustrated in FIG. 6.

FIG. 11 illustrates an example of the operations of the managing server MSV illustrated in FIG. 6. Operations that are the same as or similar to the operations illustrated in FIG. 5 are indicated by the same reference symbols as those illustrated in FIG. 5, and a detailed description thereof is omitted. Operations illustrated in FIG. 11 are achieved by the control program executed by the managing server MSV and are repeatedly executed at predetermined time intervals (of, for example, 10 seconds). Specifically, FIG. 11 illustrates an example of the method for controlling the information processing system and the program for controlling the managing device.

First, in S10, the power information acquirer 10 of the managing server MSV acquires values of power consumed by the servers SV stored in all the racks RC included in the information processing system SYS2 from the servers SV. The power information acquirer 10 causes the acquired consumed power values and times and dates when the consumed power values are acquired to be stored in the server management table SVTBL.

Then, in S12, the rack power calculator 14 of the managing server MSV calculates values (or total consumed power values) of power consumed by the power distribution units PDU, based on the power supply information stored in the server management table SVTBL and the values, stored in the server management table SVTBL, of power consumed by the servers SV. The rack power calculator 14 causes the calculated consumed power values to be stored in the rack management table RCTBL.

Then, in S14, the power supply switching determiner 16 of the managing server MSV determines whether or not a rack RC of which the value of consumed power exceeds the threshold PVT1 exists. If the rack RC of which the value of consumed power exceeds the threshold PVT1 exists, the power supply switching determiner 16 causes the process to proceed to S16. If the rack RC of which the value of consumed power exceeds the threshold PVT1 does not exist, the power supply switching determiner 16 determines that the power distribution units PDU are able to consume more power and terminates the process.

In S16, the power supply switching determiner 16 determines whether or not a rack RC of which the value of consumed power is equal to or smaller than the threshold PVT3 exists. If the rack RC of which the value of consumed power is equal to or smaller than the threshold PVT3 exists, the power supply switching determiner 16 causes the process to proceed to S22 in order to reduce the value of power to be consumed by the power distribution unit PDU of the rack RC. The power supply switching determiner 16 determines that it is difficult to switch the power distribution unit PDU configured to supply power to servers SV, and the power supply switching determiner 16 causes the process to proceed to S40.

In S22, the power supply switching determiner 16 switches a power supply of at least any of servers SV stored in the target rack RC so that power is supplied to the server SV from a power distribution unit PDU of a rack RC located adjacent to the target rack RC on one side of the target rack RC of which the value of consumed power was determined to exceed the threshold PVT1 in S14. Then, the power supply switching determiner 16 updates the server management table SVTBL based on the switching of the power supply of the server SV.

In the example illustrated in FIG. 6, if the target rack RC of which the value of consumed power was determined to exceed the threshold PVT1 in S14 is the rack RC12, the rack RC located adjacent to the target rack RC on the one side of the target rack RC is the rack RC11. If the target rack RC is the rack RC11, the adjacent rack RC located on the one side of the target rack RC is the rack RC21. If the target rack RC is the rack RC21, the adjacent rack RC located on the one side of the target rack RC is the rack RC22. If the target rack RC is the rack RC25, the adjacent rack RC located on the one side of the target rack RC is the rack RC15.

The power supply switching determiner 16 switches, based on the following requirements 1 to 3, the power supply switch PSW of the target server SV so that power is supplied to the target server SV stored in the target rack RC from the power distribution unit PDU of the rack RC located adjacent to the target rack RC on the one side of the target rack RC. The following requirements 1 to 3 are an example of the control. For example, the requirement 3 may be omitted.

The requirement 1 is that the server SV is operating.

The requirement 2 is that power is being supplied to the server SV from the power distribution unit PDU of the target rack RC. In other words, the supply of power to the server SV from an adjacent rack RC due to the switching of the power supply, the use of the power supply unit PS2 that is caused by a failure of the power supply unit PS1, or the like is not executed.

The requirement 3 is that power consumed by the server SV is equal to or lower than 10% of the value of power consumed by the power distribution unit PDU of the target rack RC.

The power supply switching determiner 16 selects a server SV consuming the highest power from among servers SV satisfying the requirements 1 to 3 and switches a power supply of the selected server SV. Until the total of values of power consumed by servers SV whose power supplies were switched becomes equal to or larger than 10% of the rated power value of the power distribution unit PDU or until the number of servers SV that satisfy the requirements 1 to 3 becomes zero, the power switching determiner 16 switches the power distribution unit PDU configured to supply power.

If power consumed by the servers SV does not vary and the total value of power consumed by the servers SV whose power supplies were switched is equal to or larger than 10% of the rated power value of the power distribution unit PDU, the value of power consumed by the power distribution unit PDU of the target rack RC is equal to or smaller than the threshold PVT2.

Next, in step S24, the power supply switching determiner 16 determines whether or not the value of power consumed in the target rack RC becomes equal to or smaller than the threshold PVT2. In other words, the power supply switching determiner 16 determines whether or not the switching of the power supply was successful. If the value of power consumed in the target rack RC becomes equal to or smaller than the threshold PVT2, the power supply switching determiner 16 determines that the power distribution unit PDU is able to consume more power, and the power supply switching determiner 16 terminates the process.

On the other hand, if the value of power consumed in the rack RC is larger than the threshold PVT2, the power supply switching determiner 16 determines that the average of power consumed by servers SV that receive power from the power distribution unit PDU of the target rack RC tends to increase. In this case, there is a possibility that the value of consumed power exceeds the threshold PVT1 again. Alternatively, the power supply switching determiner 16 determines that, even if the power supply is switched to the power distribution unit PDU of the rack RC located adjacent to the target rack RC on the one side of the target rack RC, the value of power consumed in the rack RC does not become equal to or smaller than the threshold PVT2. In these cases, the power supply switching determiner 16 causes the process to proceed to S26.

In S26, the power supply switching determiner 16 switches the power supply of the server SV so that power is supplied to the server SV from a power distribution unit PDU of a rack RC located adjacent to the target rack RC on the other side of the target rack RC. Then, the power supply switching determiner 16 updates the server management table SVTBL based on the switching of the power supply of the server SV. The operation of S26 is the same as the operation of S22, except that the rack RC to which the power supply is switched is located on the side opposite to the rack RC used in S22 with respect to the target rack RC.

In the example illustrated in FIG. 6, if the target rack RC is the RC14, the rack RC located adjacent to the target rack RC on the other side of the target rack RC is the rack RC15. If the target rack RC is the RC15, the adjacent rack RC located on the other side of the target rack RC is the rack RC25. If the target rack RC is the RC25, the adjacent rack RC located on the other side of the target rack RC is the rack RC24. If the target rack RC is the RC21, the adjacent rack RC located on the other side of the target rack RC is the rack RC11.

In S22 and S26, by switching the power supply of the server SV to the racks RC located adjacent to the target rack RC on both sides of the target rack RC, power to be consumed by the power distribution unit PDU of the target rack RC may be distributed to the two racks RC. Thus, the amount of distributed and consumed power may be large and the power distribution unit PDU of the target rack RC may consume more power, compared with a case where power to be consumed by the power distribution unit PDU is distributed to a rack RC located adjacent to the target rack RC on one side of the target rack RC. In other words, the probability at which the power capping is executed in S40 may be reduced, compared with the case where power to be consumed by the power distribution unit PDU is distributed to a rack RC located adjacent to the target rack RC on one side of the target rack RC. Thus, a reduction in the performance that is caused by the power capping in S40 may be suppressed or avoided.

Next, in S28, the power supply switching determiner 16 executes the same determination process as S24. Then, if the value of power consumed in the target rack RC becomes equal to or smaller than the threshold PVT2, the power supply switching determiner 16 determines that the power distribution unit PDU is able to consume more power, and the power supply switching determiner 16 terminates the process. If the value of power consumed in the target rack RC is larger than the threshold PVT2, the power supply switching determiner 16 determines that the value of consumed power is likely to exceed the threshold PVT1 again, and the power supply switching determiner 16 causes the process to proceed to S40.

In S40, the power supply switching determiner 16 instructs the power capping processor 18 illustrated in FIG. 8 to execute the power capping in order to inhibit the value of power consumed by the power distribution unit PDU that exceeds the threshold PVT1 from exceeding the rated power value of the power distribution unit PDU and terminates the process. For example, the power supply switching determiner 16 instructs the power capping processor 18 to execute the power capping in order to inhibit the value of power consumed by the power distribution unit PDU of the target rack RC from exceeding 97% of the rated power value of the power distribution unit PDU. Then, as described with reference to FIG. 8, the power capping is controlled by the power capping program.

In this case, servers SV instructed to execute the power capping may be limited to servers SV that are among the servers SV stored in the target rack RC and to which power is supplied from the power distribution unit PDU of the target rack RC. Even if a power supply of a server SV is not switched, the execution of the power capping may inhibit the value of power consumed by the power distribution unit PDU of the target rack RC from exceeding the rated power value of the power distribution unit PDU.

FIG. 11 exemplifies the case where the source of supplying power is switched to the power distribution unit PDU of the rack RC located adjacent to the target rack RC on the one side of the target rack RC in S22 and is switched to the power distribution unit PDU of the rack RC located adjacent to the target rack RC on the other side of the target rack RC in S26. However, the source of supplying power may be switched to the power distribution units PDU of the racks RC located adjacent to the target rack RC on both sides of the target rack RC in S22, and both S26 and S28 may be omitted. In this case, in S22, the power supply switching determiner 16 may alternately select the racks RC that are located adjacent to the target rack RC on both sides of the target rack RC and to which the power supply of the server SV is to be switched. Alternatively, the power supply switching determiner 16 may select a rack RC to which the power supply of the server SV is to be switched and that is any of the racks RC located adjacent to the target rack RC on both sides of the target rack RC and in which the value of power consumed by the power distribution unit PDU is smaller than that in the other rack RC.

If the operations illustrated in FIG. 11 are repeated, the rate of receiving power by servers SV of racks RC from adjacent racks RC may gradually increase. To avoid this, if the value of power consumed in a rack RC becomes equal to or smaller than the threshold PVT1, a power supply of a server SV may be switched to the target rack RC from another adjacent rack RC so that power is supplied to the server SV from the target rack RC.

In the embodiment illustrated in FIGS. 6 to 11, the densities at which the servers SV are stored in the racks RC may be increased, while values of power consumed by the power distribution units PDU do not exceed the rated power values of the power distribution units PDU, like the embodiment illustrated in FIGS. 1 to 5. A larger number of servers SV are able to be stored in the racks RC, compared with the conventional techniques. Thus, the performance of the information processing system SYS2 may be improved. Since a power supply is switched using a power distribution unit PDU whose rack power consumption rate is equal to or lower than the threshold PVT3 that is smaller than the threshold PVT2, the repetitive execution of the operation of switching a power supply between two racks RC may be suppressed or avoided. By setting the threshold PVT3 to be equal to or smaller than a value obtained by subtracting the difference between the thresholds PVT1 and PVT2 from the threshold PVT2, the rack power consumption rate of a power distribution unit PDU of which the value of consumed power increases due to the switching of a power supply may be suppressed to a value equal to or smaller than the threshold PVT2. As a result, the values of power consumed by the power distribution units PDU may be equal to each other between the racks RC. Since servers SV, for which a power distribution unit PDU configured to supply power is to be switched, are selected in descending order of power consumed by the servers SV, the number of times when the switching is executed until the rack power consumption rate becomes equal to or smaller than the threshold PVT2 may be minimized. If the value of power consumed by an adjacent rack RC exceeds the threshold PVT3, the value of the power consumed by the power distribution unit PDU may be inhibited from exceeding the rated power value of the power distribution unit PDU by the execution of the power capping, and a reduction in the reliability of the information processing system SYS2 may be suppressed or avoided.

In the embodiment illustrated in FIGS. 6 to 11, power is supplied to each of servers SV from any of two adjacent racks RC, and the value of power to be consumed by a power distribution unit PDU of a target rack RC may be efficiently distributed, compared with a case where a power supply is switched to a power distribution unit PDU of a rack RC located on only one side of the target rack RC. As a result, the probability at which the power capping is executed may be reduced and a reduction in the performance that is caused by the power capping may be suppressed or avoided, compared with the case where the power supply is switched to the power distribution unit PDU of the rack RC located on only the one side of the target rack RC.

Figure 12:
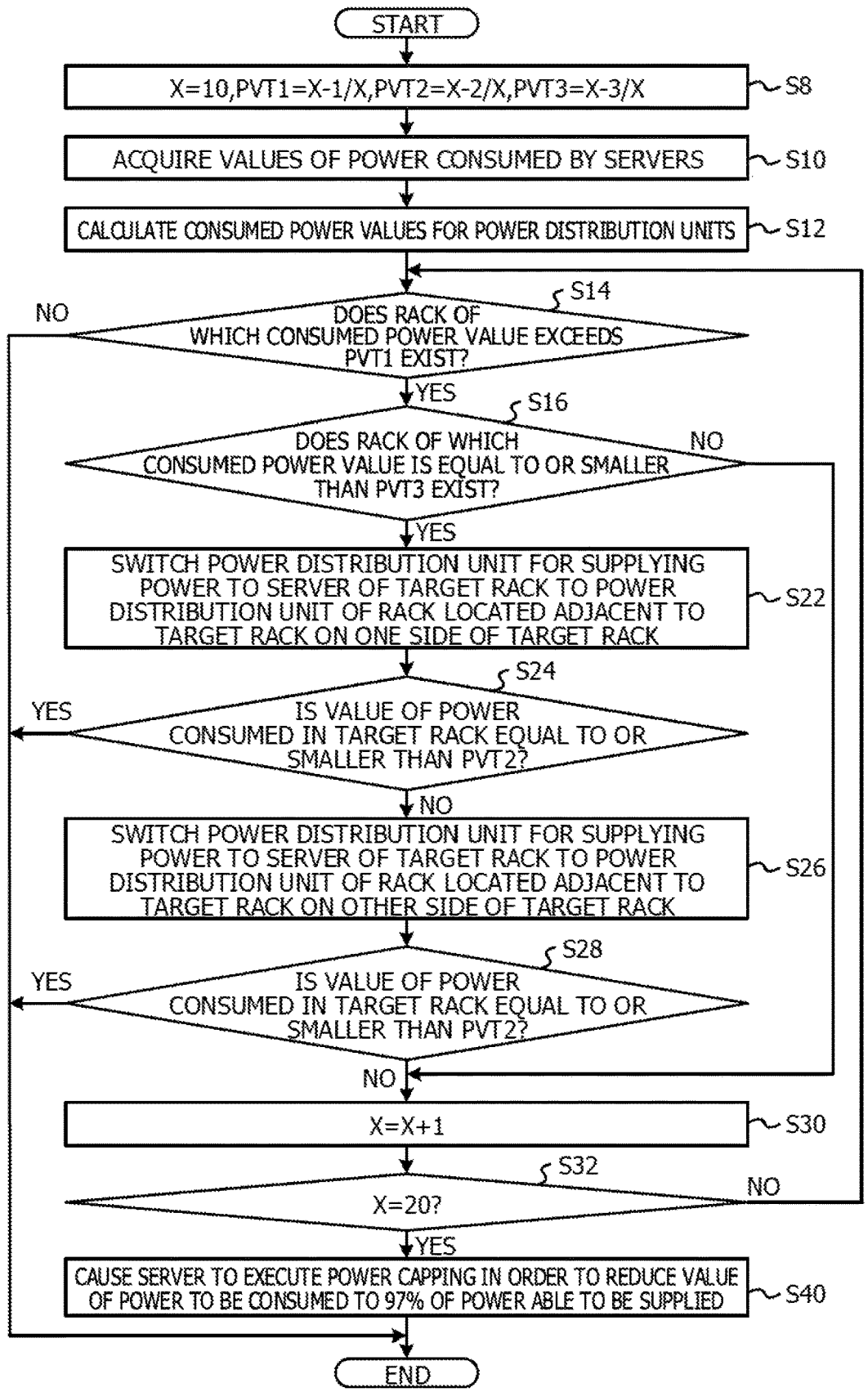
FIG. 12 is a diagram illustrating an example of operations of the managing device in another embodiment of the information processing system, the method for controlling the information processing system, and the program for controlling the managing device.

FIG. 12 illustrates an example of operations of the managing server in another embodiment of the information processing system, the method for controlling the information processing system, and the program for controlling the managing device. Operations that are the same as or similar to the operations illustrated in FIGS. 5 and 11 are indicated by the same reference symbols as those illustrated in FIGS. 5 and 11, and a detailed description thereof is omitted. An information processing system that includes the managing server MSV configured to execute the operations illustrated in FIG. 12 is the same as or similar to the information processing system SYS2 illustrated in FIG. 6, except that operations of the managing server MSV that are illustrated in FIG. 12 are different from the operations illustrated in FIGS. 5 and 11. The servers SV and the managing server MSV have configurations that are the same as or similar to the configuration illustrated in FIG. 2. Functional blocks of the managing server MSV are the same as or similar to those illustrated in FIG. 8.

In operations illustrated in FIG. 12, the managing server MSV executes an operation of switching a power supply of a server SV within a target rack RC while changing the thresholds PVT1, PVT2, and PVT3. In order to change the thresholds PVT1, PVT2, and PVT3, the managing server MSV sets a variable X to, for example, "10" and sets the thresholds PVT1, PVT2, and PVT3 based on Equations (1), (2), and (3) in S8 before S10.

$$PVT1=(X-1)/X \quad (1)$$

$$PVT2=(X-2)/X \quad (2)$$

$$PVT3=(X-3)/X \quad (3)$$

In the following description, the thresholds PVT1, PVT2, and PVT3 are percentages obtained by multiplying values obtained from Equations (1), (2), and (3) by 100. In the following description, the values of power consumed by the power distribution units PDU of the racks RC are compared with the thresholds PVT1, PVT2, and PVT3 and expressed by percentages obtained by dividing the consumed power values by the rated power values of the power distribution units PDU. In S8, the initial value of the threshold PVT1 is set to 90%, the initial value of the threshold PVT2 is set to 80%, and the initial value of the threshold PVT3 is set to 70%.

After that, the managing server MSV executes the operations of S10 to S28 in the same manner as those illustrated in FIG. 11. However, if the rack RC of which the value of consumed power is equal to or lower than the threshold PVT3 does not exist in S16, and the value of power consumed by the target rack RC is larger than the threshold PVT2 in S28, the process proceeds to S30.

Figure 13:
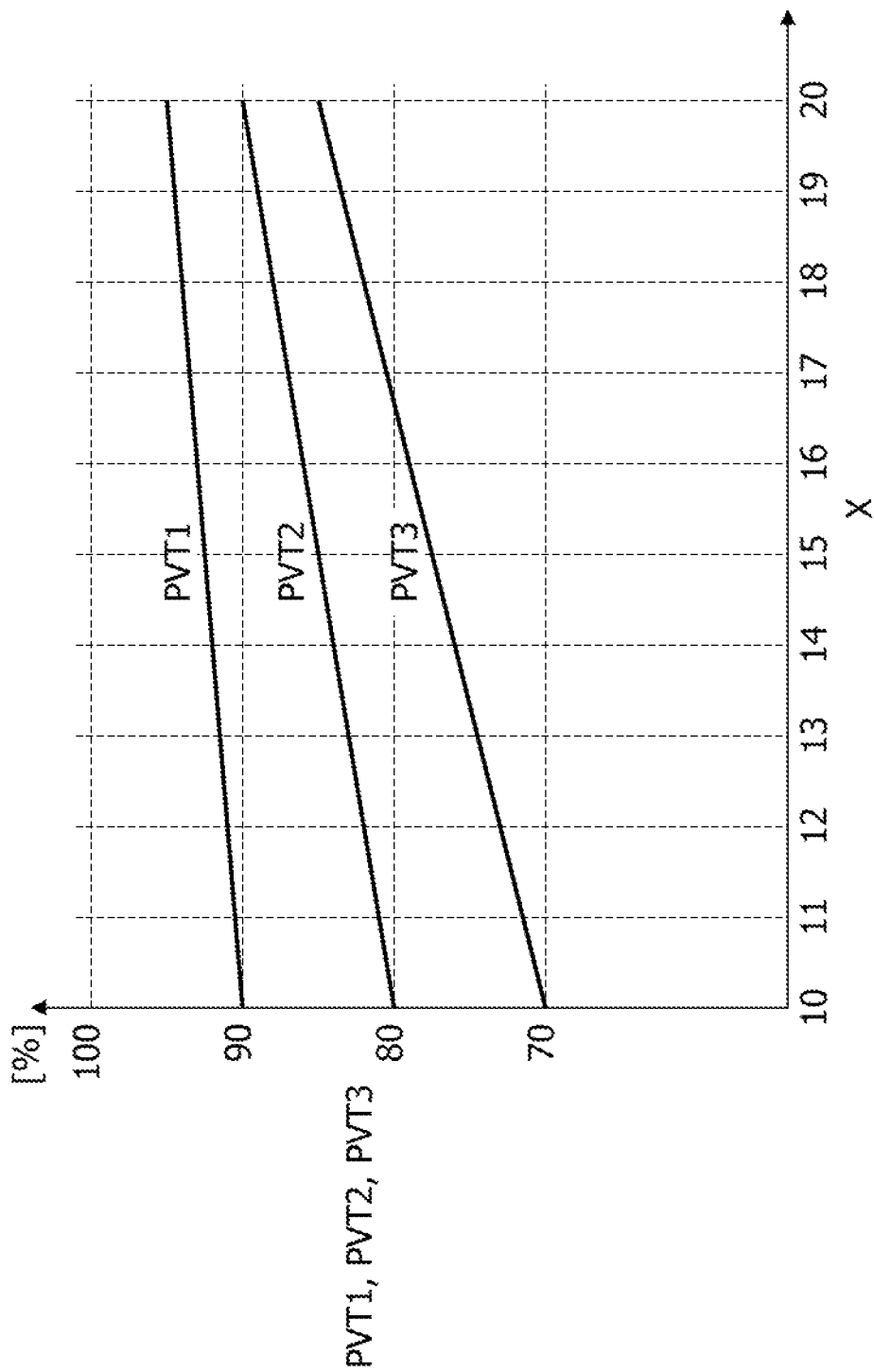
FIG. 13 is a diagram illustrating an example of changes in thresholds PVT1, PVT2, and PVT3 illustrated in FIG. 12.

In S30, the managing server MSV increments the variable X by "1" in order to ease the requirement for power to be consumed in a rack RC to which a power supply is to be switched. The thresholds PVT1, PVT2, and PVT3 increase due to the increase in the variable X based on Equations (1), (2), and (3), and the differences between the thresholds PVT1, PVT2, and PVT3 are reduced. Changes in the thresholds PVT1, PVT2, and PVT3 due to increases in the variable X are illustrated in FIG. 13.

In this embodiment, if the answer to the determination of S16 or S28 is "No", the threshold PVT3 is increased and the determination of S16 is made again. Specifically, by easing the requirement for the determination of the amount of power consumed in the rack RC to which the power supply is to be switched, the probability at which the power capping is executed may be reduced and a reduction in the performance that is caused by the power capping may be suppressed or avoided, compared with the operations illustrated in FIG. 11.

Then, if the variable X is "20" in S32, the managing server MSV causes the process to proceed to S40. If the variable X is smaller than "20" in S32, the managing server MSV causes the process to return to S14. Specifically, the managing server MSV determines whether or not the power capping is executed. In S40, the managing server MSV causes the BMC of the server SV of the target rack RC to execute the power capping in order to inhibit the value of power consumed by the power distribution unit PDU of the target rack RC from exceeding 97% of the rated power value of the power distribution unit PDU.

As described with reference to FIG. 11, if the value of power consumed in the rack RC becomes equal to or smaller than the threshold PVT1, a power supply of a server SV may be switched from a state in which the server SV receives power from an adjacent rack RC so that the server SV receives power from the power distribution unit PDU of the target rack RC.

FIG. 13 illustrates an example of changes in the thresholds PVT1, PVT2, and PVT3 illustrated in FIG. 12. The thresholds PVT1, PVT2, and PVT3 are actually discrete values, but changes in the thresholds PVT1, PVT2, and PVT3 are indicated by straight lines in FIG. 13.

As illustrated in FIG. 13, if the value of power consumed in the target rack RC does not become equal to or smaller than the threshold PVT2 by the switching of a power supply, the threshold PVT1 is sequentially increased from 90% to 95%, the threshold PVT2 is sequentially increased from 80% to 90%, and the threshold PVT3 is sequentially increased from 70% to 85%. For example, it is desirable that the threshold PVT1 be set to 95% or lower in order to execute the power capping before the value of power consumed in the target rack RC exceeds the rated power value of the power distribution unit PDU.

The thresholds PVT1 and PVT2 are increased with an increase in the threshold PVT3 in order to set the difference between the thresholds PVT1 and PVT2 and the difference between the thresholds PVT2 and PVT3 to be equal to each other. Since the difference between the thresholds PVT1 and PVT2 and the difference between the thresholds PVT2 and PVT3 are set to be equal to each other, the switching of the power supply may inhibit the value of power consumed in a rack RC to which the power supply is switched from exceeding the value of power consumed in the target rack RC. As a result, the probability at which the value of power consumed in the rack RC to which the power supply is switched exceeds the threshold PVT1 may be reduced. In addition, the switching of a power supply in another rack RC due to the switching of the power supply in the target rack RC may be suppressed or avoided. The threshold PVT1 may be fixed regardless of the variable X, the threshold PVT3 may be increased, and the threshold PVT2 may be a median value of the thresholds PVT1 and PVT3.

In the embodiment illustrated in FIGS. 12 and 13, the densities at which the servers SV are stored in the racks RC may be increased, while the values of power consumed by the power distribution units PDU do not exceed the rated power values of the power distribution units PDU, like the embodiments illustrated in FIGS. 1 to 11. A larger number of servers SV are able to be stored in the racks RC, and the performance of the information processing system may be improved, compared with the conventional techniques. Since a power supply is switched using a power distribution unit PDU whose rack power consumption rate is equal to or lower than the threshold PVT3 that is smaller than the threshold PVT2, the repetitive execution of the operation of switching a power supply between two racks RC may be suppressed or avoided. Since the threshold PVT3 is equal to or smaller than a value obtained by subtracting the difference between the thresholds PVT1 and PVT2 from the threshold PVT2, the rack power consumption rate of a power distribution unit PDU of which the value of consumed power increases due to the switching of a power supply may be suppressed to a value equal to or smaller than the threshold PVT2. As a result, the values of power consumed by the power distribution units PDU may be equal to each other between the racks RC. Since servers SV, for which a power distribution unit PDU configured to supply power is switched, are selected in descending order of power consumed by the servers SV, the number of times when the switching is executed until the rack power consumption rate of a target rack RC becomes equal to or lower than the threshold PVT2 may be minimized. If the value of power consumed in an adjacent rack RC exceeds the threshold PVT3, the execution of the power capping may inhibit the value of power consumed by the power distribution unit PDU from exceeding the rated power value of the power distribution unit PDU. As a result, a reduction in the performance of the information processing system SYS2 may be suppressed or avoided.

Since power is supplied to each of servers SV from any of two adjacent racks RC, power consumed by the power distribution units PDU of the racks RC may be efficiently distributed, compared with the case where power supplies are switched to a power distribution unit PDU of a rack RC located adjacent to a target rack RC on only one side of the target rack RC. As a result, the probability at which the power capping is executed may be reduced, compared with the case where power supplies are switched to a power distribution unit PDU of a rack RC located adjacent to a target rack RC on only one side of the target rack RC. Thus, a reduction in the performance that is caused by the power capping may be suppressed or avoided.

In the embodiment illustrated in FIGS. 12 and 13, if the answer to the determination of S16 or S28 illustrated in FIG. 12 is "No", the threshold PVT3 is increased to ease the requirement for the determination of the amount of power consumed in a rack RC to which a power supply is to be switched. Thus, the probability at which the power capping is executed may be reduced and a reduction in the performance that is caused by the power capping may be suppressed or avoided, compared with the operations illustrated in FIG. 11. Since the difference between the thresholds PVT1 and PVT2 is equal to the difference between the thresholds PVT2 and PVT3, it may be possible to inhibit the value of power consumed in the rack RC to which the power supply is switched from exceeding the value of power consumed in the target rack RC. As a result, the probability at which the value of power consumed in the rack RC to which the power supply is switched exceeds the threshold PVT1 may be reduced, and the switching of a power supply in another rack RC due to the switching of the power supply in the target rack RC may be suppressed or avoided.

Figure 14:
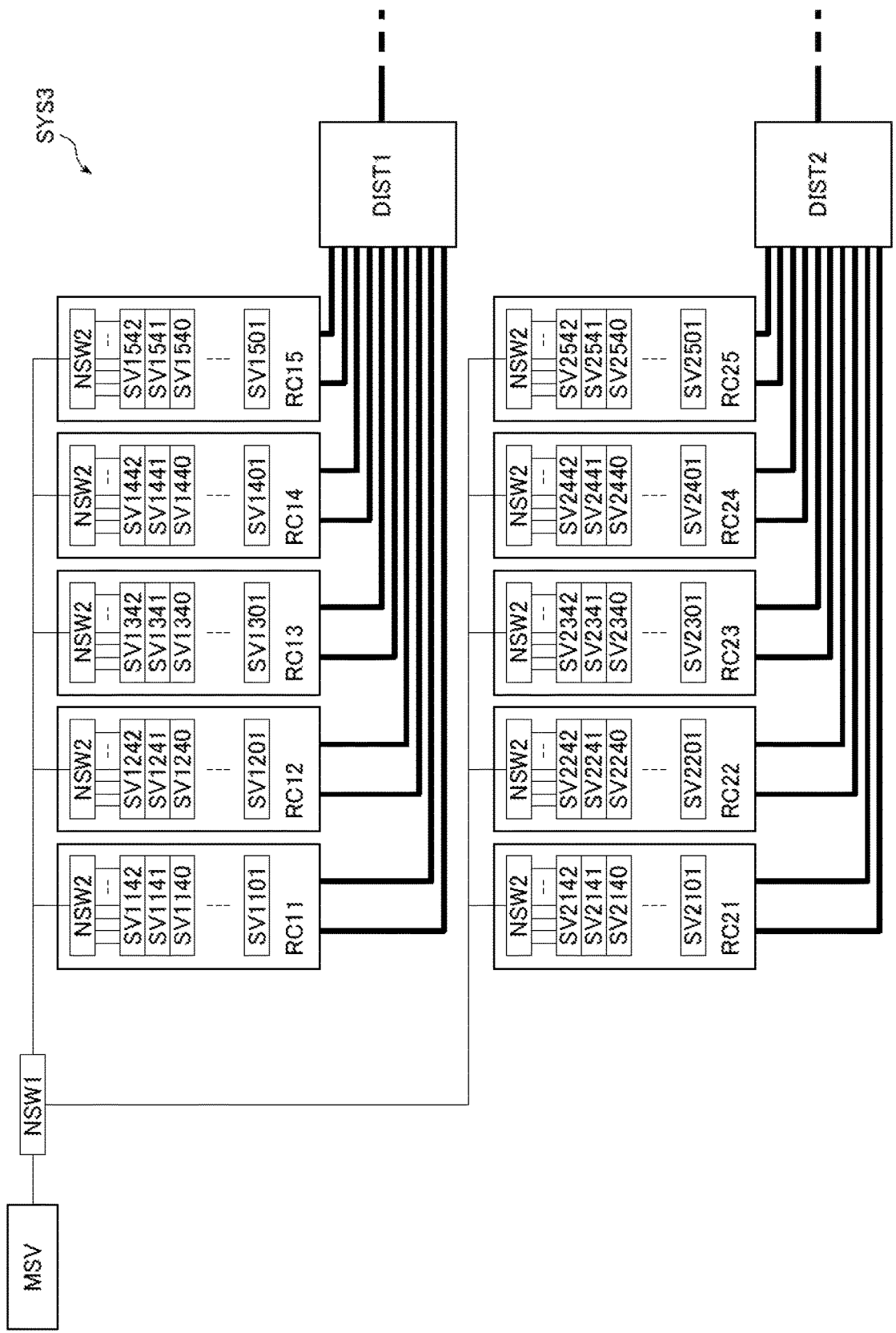
FIG. 14 is a diagram illustrating another embodiment of the information processing system, the method for controlling the information processing system, and the program for controlling the managing device.

FIG. 14 is a diagram illustrating another embodiment of the information processing system, the method for controlling the information processing system, and the program for controlling the managing device. Elements that are the same as or similar to the elements illustrated in FIGS. 1 and 6 are indicated by the same reference symbols as those illustrated in FIGS. 1 and 6, and a detailed description thereof is omitted.

An information processing system SYS3 illustrated in FIG. 14 has a configuration that is the same as or similar to that of the information processing system SYS2 illustrated in FIG. 6, except that the distribution boards DIST1 and DIST2 use 100-volt and 200-volt power lines of two types to supply power to the servers SV. Specifically, the information processing system SYS3 includes the multiple racks RC, the distribution boards DIST1 and DIST2, the managing server MSV, and the network switch NSW1. Each of the racks RC includes multiple servers SV and a network switch NSW2 coupled to the servers SV. The configurations of the servers SV are the same as or similar to the configuration illustrated in FIG. 2. Each of the servers SV includes a power supply switch PSW and a BMC for controlling the power supply switch PSW. Each of the power supply units PS1 and PS2 of the servers SV operates and generates a power-supply voltage VDD even when receiving any of alternating-current voltages of 100V and 200V. The managing server MSV has a configuration that is the same as or similar to the configuration illustrated in FIG. 2, and functional blocks of the managing server MSV are the same as or similar to those illustrated in FIG. 8.

Figure 15:
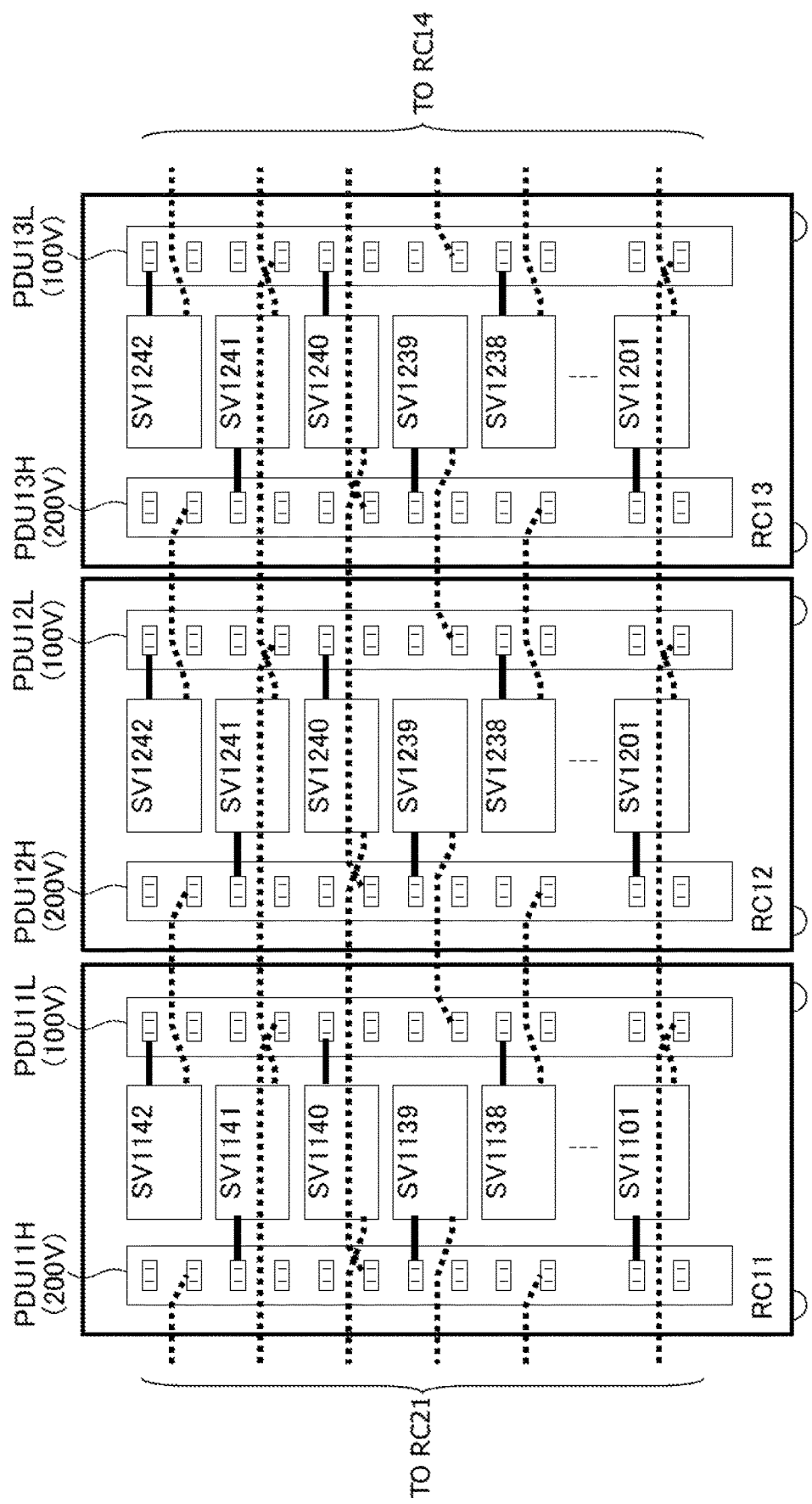
FIG. 15 is a diagram illustrating an example of connections of power supplies between racks illustrated in FIG. 14.

FIG. 15 illustrates an example of connections of the power supplies between the racks RC illustrated in FIG. 14. The racks RC include power distribution units PDUL (PDU11L, PDU12L, PDU13L, . . . ) for receiving an alternating-current voltage of 100V and power distribution units PDUH (PDU11H, PDU12H, PDU13H, . . . ) for receiving an alternating-current voltage of 200V.

Each of the servers SV is coupled to a power distribution unit PDUL of a target rack RC and a power distribution unit PDUH of any of adjacent racks RC or coupled to a power distribution unit PDUH of a target rack RC and a power distribution unit PDUL of any of adjacent racks RC. For example, as illustrated in FIG. 2, a power supply line of a power supply unit PS1 of each of the servers SV is coupled to a power distribution unit PDUL or PDUH of a target rack RC, while a power supply line of a power supply unit PS2 of each of the servers SV is coupled to a power distribution unit PDUL or PDUH of any of adjacent racks RC. Servers SV to which power is supplied from a single power distribution unit PDUL or PDUH belongs to a single group. Specifically, each of the servers SV belongs to any of groups of the power distribution units PDUL or PDUH configured to supply power.

In the example illustrated in FIG. 15, the power supply units PS1 of the servers SV whose last digits are even numbers are coupled to the 100V power distribution units PDUL of the target racks RC, and the power supply units PS1 of the servers SV whose last digits are odd numbers are coupled to the 200V power distribution units PDUH of the target racks RC. The power supply units PS2 of the servers SV whose last digits are even numbers are coupled to 200V power distribution units PDUH of racks RC located adjacent to the target racks RC on one or other sides of the target racks RC. The power supply units PS2 of the servers SV whose last digits are odd numbers are coupled to 100V power distribution units PDUL of racks RC located adjacent to the target racks RC on one or other sides of the target racks RC.

Specifically, 25% of the servers SV stored in the racks RC are coupled to the 100V power distribution units PDUL of the target racks RC and the 200V power distribution units PDUH of the racks RC located adjacent to the target racks RC on the right sides of the target racks RC in FIG. 15. Other 25% of the servers SV stored in the racks RC are coupled to the 200V power distribution units PDUH of the target racks RC and the 100V power distribution units PDUL of the racks RC located adjacent to the target racks RC on the right sides of the target racks RC in FIG. 15. Other 25% of the servers SV stored in the racks RC are coupled to the 100V power distribution units PDUL of the target racks RC and the 200V power distribution units PDUH of the racks RC located adjacent to the target racks RC on the left sides of the target racks RC in FIG. 15. The other remaining servers SV stored in the racks RC are coupled to the 200V power distribution units PDUH of the target racks RC and the 100V power distribution units PDUL of the racks RC located adjacent to the target racks RC on the left sides of the target racks RC in FIG. 15.

The power supply units PS1 and PS2 of the servers SV stored in the racks RC14, RC15, and RC21 to RC25 illustrated in FIG. 14 are coupled in the same manner as the connections illustrated in FIG. 15. The rack RC11 is located at an edge, and a rack RC located adjacent to the rack RC11 on the side opposite to the rack RC12 is the rack RC21. The rack RC21 is located at the edge, and a rack RC located adjacent to the rack RC21 on the side opposite to the rack RC22 is the rack RC11. The rack RC15 is located at the other edge, and a rack RC located adjacent to the rack RC15 on the side opposite to the rack RC14 is the rack RC25. The rack RC25 is located at the other edge, and a rack RC located adjacent to the rack RC25 on the side opposite to the rack RC24 is the rack RC15.

In the information processing system SYS3 illustrated in FIG. 14, the managing server MSV independently executes the operations illustrated in FIG. 11 or FIG. 12 on the 100V power distribution units PDUL and 200 power distribution units PDUH of the racks RC. Specifically, the managing server MSV executes the operations illustrated in FIG. 11 or FIG. 12 based on values of power consumed by the power distribution units PDUL and executes the operations illustrated in FIG. 11 or FIG. 12 based on values of power consumed by the power distribution units PDUH. Then, servers SV coupled to a power distribution unit PDUL of a target rack RC independently execute the power capping, and servers SV coupled to a power distribution unit PDUH of the target rack RC independently execute the power capping.

In the embodiment illustrated in FIGS. 14 and 15, effects that are the same as or similar to those obtained in the embodiments illustrated in FIGS. 1 to 13 may be obtained. In the embodiment illustrated in FIGS. 14 and 15, even in the case where each of the racks RC receives power from different power supply lines, the densities at which the servers SV are stored in the racks RC may be increased and values of power consumed by the power distribution units PDUL and PDUH do not exceed the rated power values of the power distribution units PDUL and PDUH. A larger number of servers SV are able to be stored in the racks RC, and the performance of the information processing system SYS3 may be improved, compared with the conventional techniques.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:
1. An information processing system, comprising:
a plurality of servers respectively stored in one of a plurality of racks; and a management server coupled to the plurality of servers and configured to:
acquire consumed power values from the plurality of servers when power is supplied to the plurality of servers, calculate a total value of the acquired consumed power values for each of the plurality of racks, and determine whether a first rack of which total consumed power value has exceeded a first threshold exists among the plurality of racks, determine whether a second rack of which total consumed power value is equal to or smaller than a second threshold exists among the plurality of racks when it is determined that the first rack of which total consumed power value has exceeded the first threshold exists, switch a power supply line of the first rack such that power is supplied from a power strip of the second rack to either of one or more target servers stored in the first rack until the total consumed power value of the first rack becomes equal to or smaller than a third threshold which is smaller than the first threshold when it is determined that the second rack of which total consumed power value is equal to or smaller than the second threshold exists, and switch a power supply of any of servers that are among the plurality of servers and of which values of consumed power are smaller than a value obtained by subtracting difference between the first and third thresholds from the third threshold.

2. The information processing system according to claim 1, wherein the management server is configured to cause at least any of servers stored in the first rack to execute power capping when it is determined that the second rack of which total consumed power value is equal to or smaller than the second threshold does not exist.

3. The information processing system according to claim 1, wherein the management server is configured to cause at least any of servers stored in the first rack to activate a virtual server so as to execute processes by the virtual server.

4. The information processing system according to claim 1, wherein the management server is configured to switch the power supply line of the at least one server when a total of values of power consumed by servers coupled to the power strip is equal to or smaller than a fourth threshold that is smaller than the third threshold.

5. The information processing system according to claim 4, wherein the management server is configured to increase the fourth threshold so that the fourth threshold is smaller than the third threshold when the total of the values of power consumed by the servers coupled to the power strip is larger than the fourth threshold.

6. The information processing system according to claim 1, wherein the management server is configured to switch power supplies of the target servers in descending order of power consumed by the target servers.

7. The information processing system according to claim 1, wherein each of the plurality of servers includes:
  a first power supply configured to generate a first power-supply voltage based on power supplied from a first power supply line,
  a second power supply configured to generate a second power-supply voltage based on power supplied from a second power supply line, and
  a switch configured to select any of the first and second power-supply voltages, and
wherein the management server is configured to switch power supplies of the plurality of servers by transmitting instructions to control the switches to the plurality of servers.

8. A control method executed by a processor included in a management server coupled to a plurality of servers stored in a first rack, the control method comprising:
  acquiring consumed power values from the plurality of servers when power is supplied to the plurality of servers;
  calculating a total value of the acquired consumed power values for each of a plurality of racks;
  determining whether the first rack of which total consumed power value has exceeded a first threshold exists among the plurality of racks;
  determining whether a second rack of which total consumed power value is equal to or smaller than a second threshold exists among the plurality of racks when it is determined that the first rack of which total consumed power value has exceeded the first threshold exists;
  switching a power supply line of the first rack such that power is supplied from a power strip of the second rack to either of one or more target servers stored in the first rack until the total consumed power value of the first rack becomes equal to or smaller than a third threshold which is smaller than the first threshold when it is determined that the second rack of which total consumed power value is equal to or smaller than the second threshold exists: and
    switching a power supply of any of servers that are among the plurality of servers and of which values of consumed power are smaller than a value obtained by subtracting difference between the first and third thresholds from the third threshold.

9. A management server coupled to a plurality of servers stored in a first rack, the management server comprising:
  a memory; and
  a processor coupled to the memory and configured to:
  acquire consumed power values from the plurality of servers when power is supplied to the plurality of servers,
  calculate a total value of the acquired consumed power values for each of a plurality of racks, and
  determine whether the first rack of which total consumed power value has exceeded a first threshold exists among the plurality of racks,
  determine whether a second rack of which total consumed power value is equal to or smaller than a second threshold exists among the plurality of racks when it is determined that the first rack of which total consumed power value has exceeded the first threshold exists,
  switch a power supply line of the first rack such that power is supplied from a power strip of the second rack to either of one or more target servers stored in the first rack until the total consumed power value of the first rack becomes equal to or smaller than a third threshold which is smaller than the first threshold when it is determined that the second rack of which total consumed power value is equal to or smaller than the second threshold exists, and
    switch a power supply of any of servers that are among the plurality of servers and of which values of consumed power are smaller than a value obtained by subtracting difference between the first and third thresholds from the third threshold.

\* \* \* \* \*